United States Patent [19]
Miyawaki et al.

[11] Patent Number: 6,166,792
[45] Date of Patent: Dec. 26, 2000

[54] REFLECTIVE LCD HAVING REFLECTIVITY CHARACTERISTICS BETWEEN ELECTRODES AND REFLECTOR

[75] Inventors: Mamoru Miyawaki, Isehara; Takeshi Ichikawa, Hachioji; Hiroo Akabori, Atsugi; Katsumi Kurematsu, Hiratsuka; Osamu Koyama, Hachioji, all of Japan

[73] Assignee: Canon Kabushiki Kaisha, Tokyo, Japan

[21] Appl. No.: 08/953,406

[22] Filed: Oct. 17, 1997

[30] Foreign Application Priority Data

Oct. 18, 1996 [JP] Japan .................................. 8-276528
Oct. 9, 1997 [JP] Japan .................................. 9-277475

[51] Int. Cl.$^7$ .................. G02F 1/1335; G02F 1/136; G02F 1/1343
[52] U.S. Cl. .................. 349/113; 349/43; 349/143
[58] Field of Search .................. 349/42, 43, 113, 349/143

[56] References Cited

U.S. PATENT DOCUMENTS

| | | | |
|---|---|---|---|
| 4,239,346 | 12/1980 | Lloyd | 350/334 |
| 4,981,340 | 1/1991 | Kurematsu et al. | 350/333 |
| 5,176,557 | 1/1993 | Okunuki et al. | 445/24 |
| 5,218,232 | 6/1993 | Yuzurihara et al. | 257/754 |
| 5,251,050 | 10/1993 | Kurematsu et al. | 359/57 |
| 5,412,240 | 5/1995 | Inoue et al. | 257/347 |
| 5,434,441 | 7/1995 | Inoue et al. | 257/347 |
| 5,633,737 | 5/1997 | Tanaka et al. | 349/5 |
| 5,644,373 | 7/1997 | Furushima et al. | 349/158 |
| 5,661,531 | 8/1997 | Greene et al. | 349/73 |
| 5,699,135 | 12/1997 | Hisatake et al. | 349/113 |
| 5,706,021 | 1/1998 | Kurematsu | 345/89 |
| 5,706,067 | 1/1998 | Colgan et al. | 349/114 |
| 5,708,486 | 1/1998 | Miyawaki et al. | 349/113 |
| 5,717,473 | 2/1998 | Miyawaki | 349/43 |
| 5,764,319 | 6/1998 | Nishihara | 349/8 |
| 5,861,928 | 1/1999 | Sekiguchi et al. | 349/44 |
| 5,933,204 | 8/1999 | Fukumoto | 349/43 |

FOREIGN PATENT DOCUMENTS

| | | |
|---|---|---|
| 0865209 | 9/1998 | European Pat. Off. . |
| 9073103 | 3/1997 | Japan . |
| 10-254370 | 9/1998 | Japan . |

OTHER PUBLICATIONS

Patent Abstracts of Japan, vol. 095, No. 008, Sep. 29, 1995 & JP 07 120744 A (Toshiba Corp), May 12, 1995 * abstract * & Data Base WPI, Section Ch, Week 9528, Derwent Publications Ltd., London, GB; Class L03, AN 95–209752 & JP 07 120744 A (Toshiba KK), May 12, 1995 * abstract *.
Patent Abstracts of Japan, vol. 095, No. 007, Aug. 31, 1995 & JP 07 104275 A (Casio Comput Co Ltd), Apr. 21, 1995 * abstract *.

*Primary Examiner*—James A. Dudek
*Assistant Examiner*—Toan Ton
*Attorney, Agent, or Firm*—Fitzpatrick, Cella, Harper & Scinto

[57] ABSTRACT

A reflection type liquid crystal apparatus comprises a pixel electrode substrate carrying thereon a plurality of pixel electrodes, an opposite substrate disposed vis-a-vis said pixel electrodes and a liquid crystal material filling the gap between the substrates and adapted to display images by causing the pixel electrodes to reflect light entering from the opposite substrate. A reflection layer is arranged below a plurality of openings defined by the plurality of pixel electrodes to reflect light entering through the openings back to the openings.

27 Claims, 26 Drawing Sheets

ORIGINAL COLOR (R/G/B MIXED)

REFLECTIVE LCD HAVING REFLECTIVITY CHARACTERISTICS BETWEEN ELECTRODES AND REFLECTOR

BACKGROUND OF THE INVENTION

1. Field of the Invention

This invention relates to a pixel electrode substrate to be used for a reflection type liquid crystal apparatus and to a liquid crystal apparatus using such a pixel electrode substrate for displaying pictures and characters as well as to a display apparatus using such a liquid crystal apparatus. More particularly, it relates to a reflection type liquid crystal apparatus comprising a pair of opposing substrates and liquid crystal filling the gap between the substrates, one of which carries thereon a plurality of patterned pixel electrodes for receiving light emitted from the other substrate.

2. Related Background Art

The world has entered a so-called multi-media age and devices and equipment for exchanging pictorial information for communication purposes are playing an ever-increasingly important role, Liquid crystal apparatus are attracting attention because they can be realized in a thin and portable form and consume only a small amount of power so that the industry of manufacturing such devices has grown as one of the major industries, comparable with the semiconductor industry.

Liquid crystal apparatus are at present popularly used for so-called notebook size personal computers having a size as short as ten inches. Additionally, liquid crystal is expected to play a major role in displays of electronic work stations and home television sets that typically comprise a large display screen. However, a large display screen involves high manufacturing cost and is required to meet rigorous electric requirements for driving the large screen. As a rule of thumb, the manufacturing cost of a liquid crystal display panel is said to be proportional to the square or cube of the size of the screen.

Thus, as an alternative, a projection system designed to use a small liquid crystal panel and enlarge the image formed on it has been proposed. Such a system is made feasible mainly due to the recent development of finely sized semiconductor devices that operate excellently and can be manufactured at low cost.

In view of the recent technological development, there is an increasing demand for small TFTs provided with a satisfactory drive power to be used in liquid crystal display panels comprising TFTs that use thin film transistors as switching devices for pixel electrodes. Additionally, TFTs using polycrystalline Si rather than amorphous Si are gaining popularity. Video signals for the level of resolution necessary to meet the NTSC standards that are used for the NTSC television system do not require high speed processing capabilities. Therefore, not only TFTs but also components of peripheral circuits including shift registers and decoders may be made of polycrystalline Si to produce a liquid crystal display apparatus wherein a display region and peripheral drive circuits are integrally formed.

However, the performance of polycrystalline Si is less than that of monocrystalline Si so that shift registers, for example, may have to be divided into a plurality of groups that are installed separately in order to realize a television set with a level of resolution higher than the level required by the NTSC standards or a computer display with the so-called XGA or SXGA class of resolution. Then, noise can appear as ghost along the boundaries of the separated devices in the display region to provide a problem to be solved.

In an attempt to bypass this problem, display apparatuses comprising a monocrystalline Si substrate having a high drive potential have been proposed to replace display apparatus of the above described integral type using monocrystalline Si. Since the drive potential of the transistors of the peripheral drive circuits of such display apparatus is satisfactory, the above described technique of dividing devices is not necessary here and hence the noise problem can be successfully avoided.

Liquid crystal display apparatus as described above are typically categorized into two types; the transmission type comprising a liquid crystal layer arranged between transparent electrodes for displaying images by controlling the transmission of incident light; and the reflection type for displaying images by providing a light-reflecting surface on the rear side substrate controlling the reflection of incident light.

As for the reflection type liquid crystal apparatus, the pixel electrodes arranged on the rear side substrate are patterned to show a matrix that has openings between any adjacently located pixel electrodes. As light enters through the openings, drive devices such as transistors arranged below the pixel electrodes and some of the peripheral circuits are irradiated with incident light to give rise to leak currents that adversely affect the image displaying characteristics of the apparatus.

SUMMARY OF THE INVENTION

Therefore, an object of the present invention is to provide a reflection type liquid crystal apparatus that is free from the above identified problems and adapted to effectively utilize incident light that enters through openings defined by the pixel electrodes of the apparatus.

Another object of the present invention is to provide a pixel electrode substrate to be used for a liquid crystal apparatus comprising a plurality of pixel electrodes and adapted to display images by causing the pixel electrodes to reflect incident light, characterized in that a reflection layer is arranged below openings defined by said plurality of pixel electrodes to reflect light entering through the openings back to said openings.

Still another object of the present invention is to provide a reflection type liquid crystal apparatus comprising a pixel electrode substrate carrying thereon a plurality of pixel electrodes, an opposite substrate disposed vis-a-vis said pixel electrodes and a liquid crystal material filling the gap between the substrates and adapted to display images by causing the pixel electrodes to reflect light entering from said opposite substrate, characterized in that a reflection layer is arranged below openings defined by said plurality of pixel electrodes to reflect light entering through the openings back to said openings.

According to the invention, the reflection layer formed below the openings, each being defined by adjacently located ones of said pixel electrodes, in order to reflect light entering through the openings back to said openings has the following advantages.

(1) The intensity of signal light is raised (and that of the diffracted light component is reduced) to enhance the clearness and the contrast of the displayed image.

(2) Since the areas between one pixel electrode and the other pixel electrode can participate in the operation of displaying images, the displayed image is free from the boundary lines of the pixel electrodes and appears very natural.

(3) Since the displayed image is free from the boundary lines of the pixel electrodes, a large number of pixels can be densely arranged on a small panel without giving rise to any problem. When the boundary lines of the pixel electrodes are noticeable, the pixel electrodes have to be so sized as to minimize the effect of the noticeable boundary lines so that a display panel designed to display clear images is inevitably made large. The arrangement of a reflection layer according to the invention dissolves this problem.

DETAILED DESCRIPTION OF THE PREFERRED EMBODIMENTS

Now, the present invention will be described by referring to the accompanying drawings. First, a reflection type liquid crystal display apparatus disclosed earlier by the inventors of the present invention (Japanese Patent Application No. 7-186473) will be described by referring to FIG. 10 in order to illustrate the underlying idea and the basic configuration that are common to display apparatus of the type under consideration.

Figure 10:
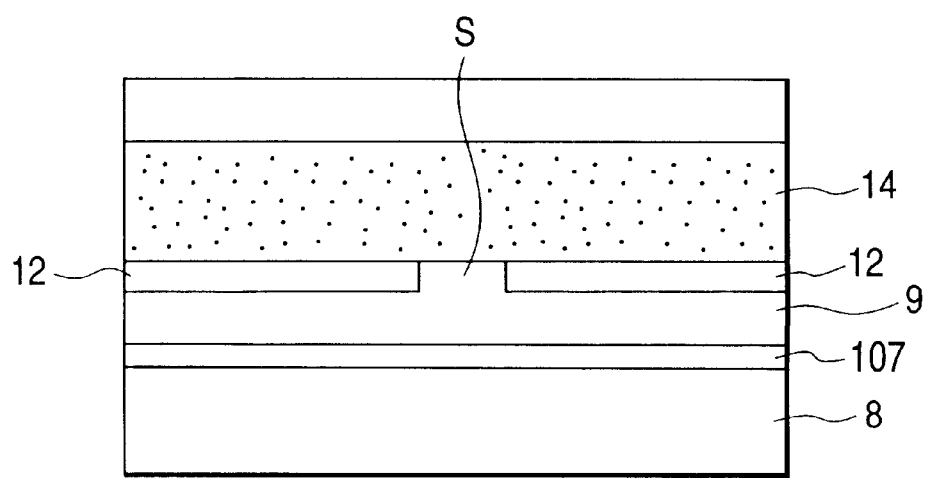
FIG. 10 is a schematic illustration also showing in cross section a display area of a reflection type liquid crystal display apparatus.

FIG. 10 is a schematic illustration showing in cross section a display area of a reflection type liquid crystal display apparatus. In FIG. 10 there are shown an insulation layer 8, a light shielding layer 107 typically made of a material having a low reflectivity such as Ti, TiN, W or Mo, another insulation layer 9, pixel electrodes 12 having a reflection surface and typically made of aluminum or an aluminum compound such as Al, AlSi, AlSiCu, AlSiGe, AlGeCu or AlC or some other metal such as Cr, Au or Ag, a liquid crystal layer 14 and an opening S between adjacently located pixel electrodes.

The light shielding layer 107 is arranged in such a manner that it is found at least right below the openings S defined by the pixel electrodes 12 so that light entering the openings S is blocked by the light shielding layer 107 and does not strike the circuits located below the light shielding layer.

Figure 9:
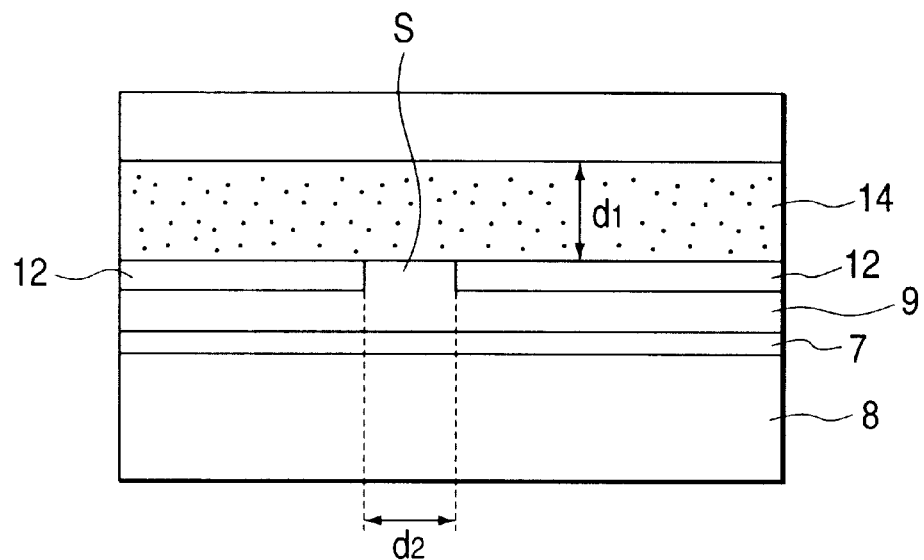
FIG. 9 is a schematic illustration showing in cross section a display area of a reflection type liquid crystal display apparatus according to the invention.

Referring now to FIG. 9, in a reflection type liquid crystal display apparatus according to the invention, the light shielding layer 107 typically made of a low reflection type material such as Ti, TiN, W or Mo is replaced by a high reflection layer 7 so that rays of light entering the openings S are reflected back to the respective openings S. The high reflection layer 7 is preferably made of a high reflection metal material. Materials that can be used for the layer 7 include Al, AlSi, AlSiCu, AlSiGe, AlGeCu, AlC, AlCu and AlSiGeCu as well as other metals such as Cr, Au and Ag.

In FIG. 9, d1 and d2 respectively denote the thickness of the liquid crystal layer 14 and the width of the openings S.

The material of the high reflection layer 7 may be same as or different from that of the pixel electrodes.

The reflectivity of the high reflection layer is dependent on the condition of the related interface of the layer and hence the reflectivity of the layer can be improved by smoothing the interface. More specifically, while the reflectivity of the surface of a metal layer formed by the usual deposition apparatus will be about 80 to 85% for aluminum, the reflectivity can be remarkably improved by smoothing and polishing the surface of the metal layer to make it mirror shine. The reflectivity of the high reflection layer can be improved by smoothing the underlying insulation layer and/or the high reflection layer itself by chemical mechanical polishing (hereinafter referred to as CMP).

Although the reflectivity of the high reflection layer can vary depending on the ratio of the transmissivity of the liquid crystal layer located above the openings and that of the liquid crystal layer located above the pixel electrodes, the high reflection layer preferably shows a reflectivity equal to 60% to 150%, preferably equal to 80% to 120% of the reflectivity of the pixel electrodes if light reflected by the high reflection layer is used for signal light.

Note that the pixel electrodes have an ordinary reflection surface and are typically made of a material selected from the above listed high reflection metal materials, although they may have a double-layered configuration and may be provided with a transparent protection film arranged on the pixel electrodes or a layer designed to improve the reflectivity of the pixel electrodes.

Now, the function of the high reflection layer will be described by referring to FIGS. 11 to 14.

Figure 11:
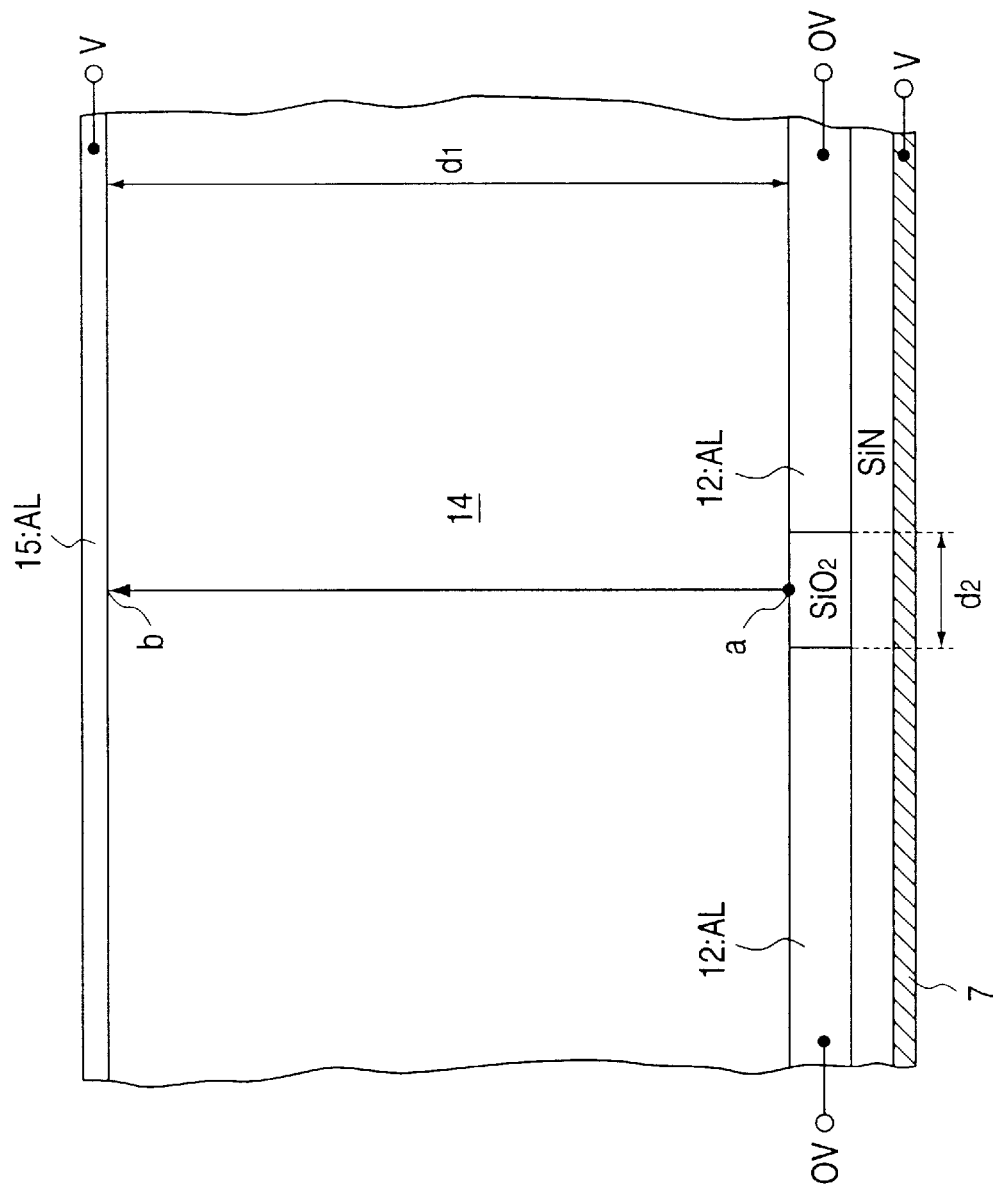
FIG. 11 is a schematic partial cross sectional view of a reflection type liquid crystal display apparatus according to the invention.

Referring FIG. 11 in particular, an electric field is generated on an area of the liquid crystal layer 14 located above each of the openings defined by the pixel electrodes 12 when a voltage (V) is applied between the pixel electrodes 12 and the oppositely disposed common electrode 15.

The field strength of the electric field generated above the openings will be substantially equal to the field strength above the pixel electrodes in areas located close to the common electrode 15, whereas it will be attenuated to become weaker than the field strength above the pixel electrodes in areas located close to the openings (particularly at the centers of the openings).

If the openings have a small width, the attenuation in the field strength will not be remarkable in areas located close to the openings so that light reflected by the high reflection layer can be mostly utilized for signal light on the openings. However, if the opening have a large width, to the contrary, the attenuation in the field strength will become remarkable in areas located close to the openings so that only part of light reflected by the high reflection layer can be utilized for signal light on the openings.

As a result of intensive research efforts directed to finding a way of effectively utilizing light reflected by the high reflection layer for signal light, the inventors of the present invention discovered that, if the liquid crystal layer has a thickness of dl and the opening has a width of d2, light reflected by the high reflection layer can be effectively utilized when the thickness of the liquid crystal layer and the width of the openings show a relationship of $d1/d2 \geq 5$.

Figure 12:
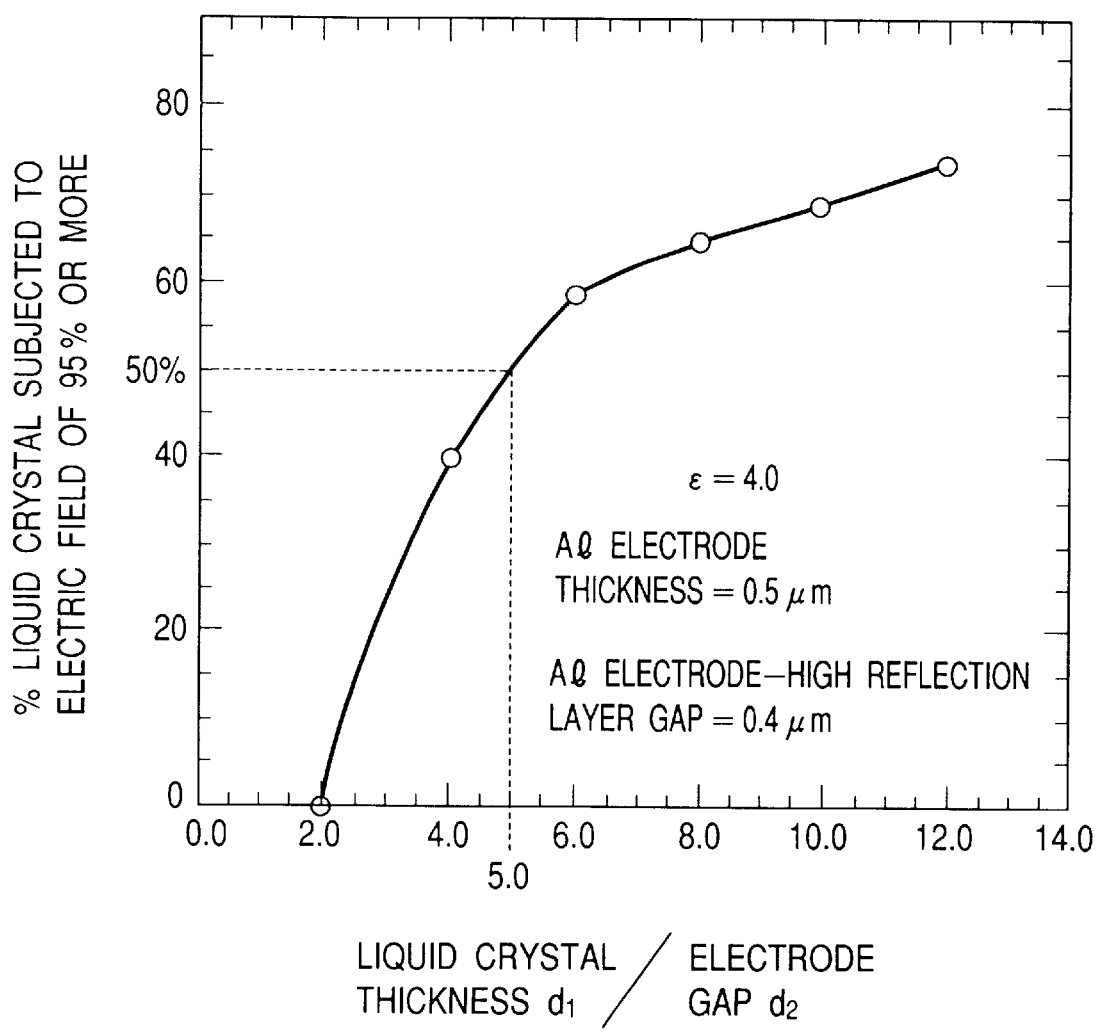
FIG. 12 is a graph showing the relationship between the ratio of the liquid crystal layer thickness to the gap distance between adjacent pixel electrodes (=d1/d2) and the ratio of the liquid crystal subjected to the electric field of the display panel by not less than 95%.

FIG. 12 is a graph showing the relationship between the ratio of the liquid crystal layer thickness to the gap distance between pixel electrodes (=d1/d2) and the ratio of the liquid crystal subjected to the electric field of the display panel by not less than 95% between the centers of the openings (point a in FIG. 11) and the common electrode (point b in FIG. 11) obtained as a result of an experiment using a display apparatus as shown in FIG. 11. Note that, in FIG. 11, a voltage of V is applied to the high reflection layer 7 and the common electrode 15, whereas the pixel electrodes 12 are held to 0V.

As shown in FIG. 12, the ratio of the liquid crystal subjected to the electric field of the display panel by not less than 95% exceeds 50% when $d1/d2 \geq 5$ so that light reflected by the high reflection layer can be utilized for signal light. Preferably, the ratio of the thickness to the width is not smaller than 6 or $d1/d2 >= 6$.

Figure 13:
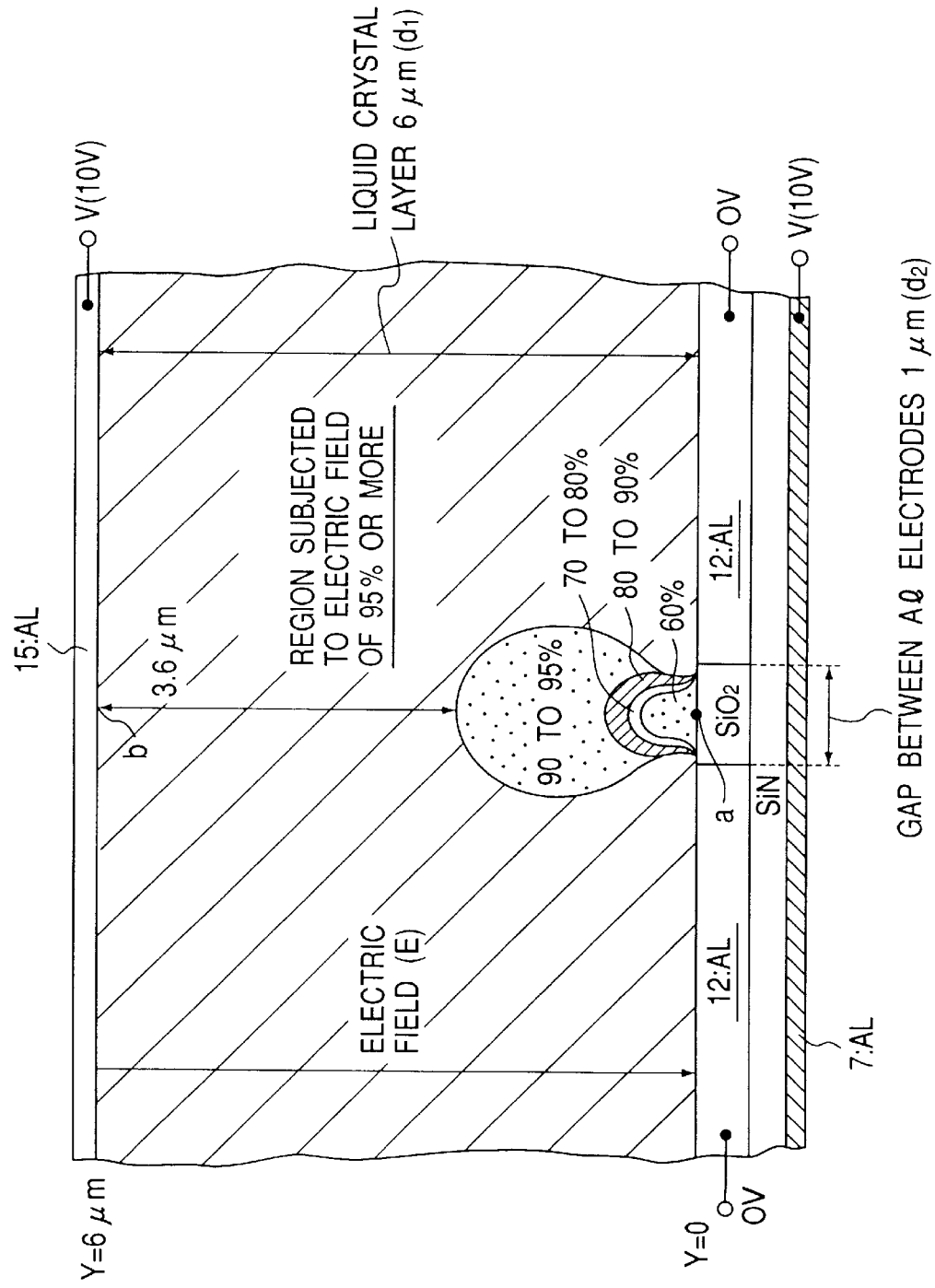
FIG. 13 is a schematic partial cross sectional view of a reflection type liquid crystal display apparatus, showing the liquid crystal layer having a thickness of 6 μm and adjacent pixel electrodes are separated by a distance of 1 μm.
Figure 14:
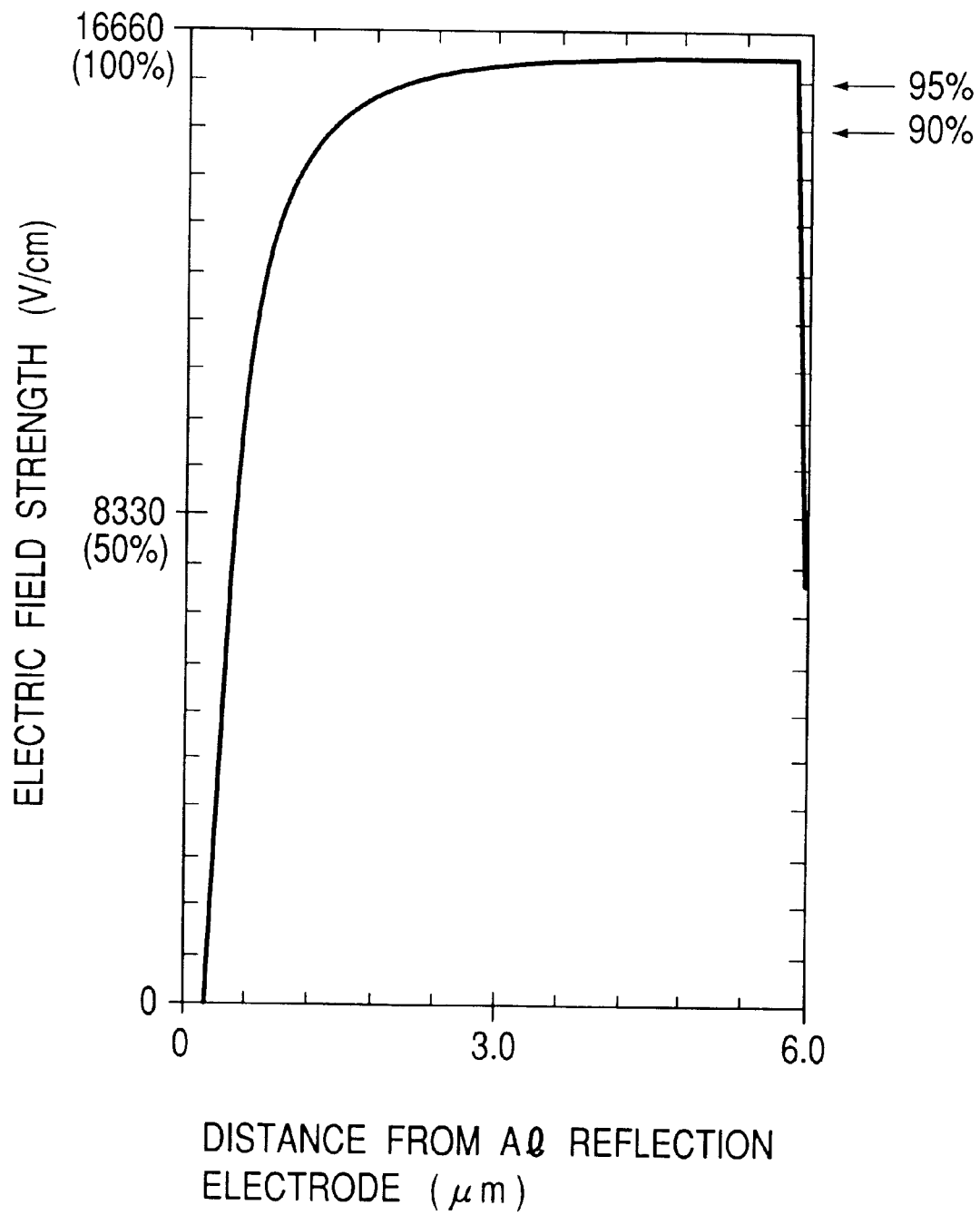
FIG. 14 is a graph showing the relationship between the distance from the pixel electrodes and the field strength.

FIG. 13 is a schematic partial cross sectional view of a reflection type liquid crystal display apparatus, showing the liquid crystal layer having a thickness of 6 μm and adjacent pixel electrodes are separated by a distance of 1 μm (d1/d2=6). It will be seen from FIG. 13 that the area showing a ratio of the liquid crystal subjected to the electric field of the display panel that is not less than 95% between the center of the opening (point a in FIG. 13; Y=0) and the common electrode (point b in FIG. 13; Y=6 μm) is confined to a zone between point b and about 3.6 μm below therefrom (about 60% of d1=6 μm) and the field strength decreases with the distance from point b. Note that a voltage V=10(V) is applied to the high reflection layer 7 and the common electrode 15 and the pixel electrodes 12 are held to V=0V in the reflection type liquid crystal display apparatus. FIG. 14 is a graph showing the relationship between the distance (Y) from the pixel electrodes and the field strength on the line connecting a and b.

Now, the present invention will be described by way of preferred embodiments, although it should be noted that the present invention is by no means limited thereto. While the embodiments comprise semiconductor substrates, the present invention is not limited to the use of semiconductor substrates and ordinary transparent substrates may alternatively be used. Additionally, while MOSFETs and TFTs are used as pixel switches for liquid crystal panels in the following description, two-terminal type devices such as diodes may alternatively be used. Embodiments of liquid crystal panels as described hereinafter may find applications including home television sets, projectors, head mount displays, 3-D image video game machines, lap-top computers, electronic notebooks, teleconferencing systems, car navigation systems and instrument panels of airplanes.

Now, the present invention will be described further by way of embodiments, referring to the accompanying drawings.

Figure 1:
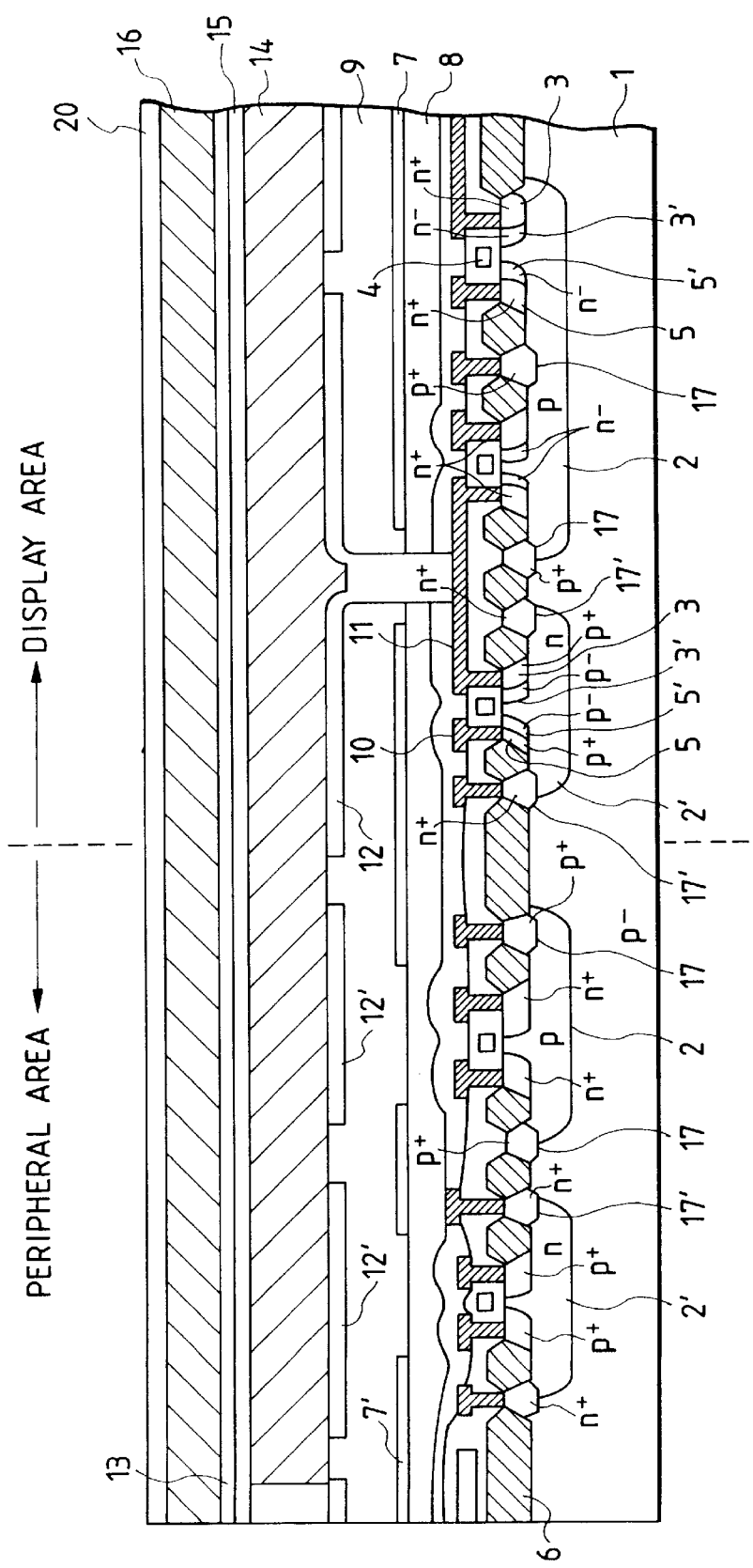
FIG. 1 is a schematic cross sectional view of a liquid crystal apparatus according to the invention.

FIG. 1 is a schematic cross sectional view of a typical liquid crystal panel according to the invention.

Referring to FIG. 1, there are shown a semiconductor substrate 1 and p-type and n-type wells 2 and 2' along with source regions 3, 3', gates 4 and drain regions 5, 5' of transistors.

As seen from FIG. 1, since a high voltage between 20 and 35V is applied to the transistors of the display region, the source/drain layer is not aligned with but offset from the gate electrode and low concentration n⁻ and p⁻ layers 3' and 5' are arranged therebetween. The offset is preferably between 0.5 and 2.0 μm. Meanwhile, part of the peripheral circuits is shown in FIG. 1. It will be seen that the gate is aligned with the source/drain layer in that part. The gate is aligned with the source/drain layer in part of the peripheral circuits because it comprises logic type circuits that may be driven only by 1.5 to 5V so that an aligned arrangement is desirable for using down-sized transistors and improving the effect of driving transistors. While the offset of the source/drain layer is described by referring to specific values, they may be modified and the gate length may be optimized to adapt itself to the breakdown voltage.

The substrate 1 is made of a p-type semiconductor material and shows the lowest potential (normally the ground potential). A voltage to be applied to the pixels which is between 20 and 35V is also applied to the n-type well in the display region, whereas a logic drive voltage between 1.5 and 5V is applied to the one in the logic section of the peripheral circuits. With this arrangement, the device can operate optimally for the voltages so that not only the chip size may be reduced but the pixels may be driven at high speed to display high quality images.

Otherwise, there are shown in FIG. 1 a field oxide film 6, source electrodes 10 connected to respective data lines and drain electrode 11 connected to respective pixel electrodes along with pixel electrodes 12 typically made of a material having a high reflectivity for providing a reflection surface and a high reflection layer 7 covering the display region. Materials that can be used for the high reflection layer include aluminum or an aluminum compound such as Al, AlSi, AlSiCu, AlSiGe, AlGeCu, AlC, AlCu or AlSiGeCu or some other metal such as Cr, Au or Ag. Reference symbol 7' denotes a light shielding layer typically made of a material same as that of the high reflection layer 7 and designed to cover the peripheral region. Note, however, that, unlike the high reflection layer 7, the light shielding layer 7' for covering the peripheral region does not have to reflect light and, therefore, may be made of a low reflectivity material such as Ti, TiN, W or Mo as in the case of the light shielding layer 107.

As seen from FIG. 1, the high reflection layer 7 in the display region covers transistors except the areas connecting the pixel electrodes and the drain electrodes, whereas the light shielding layer 7' in the peripheral region is partly removed in regions where the line capacitance can be large such as part of the video lines and the clock lines in an ingenious way so that high speed signals may be transferred without problem. If illumination light can get into the inside through areas where the light shielding layer 7' is removed to give rise to operational failures on the part of the circuits, those areas are to be covered by an electrode layer 12' arranged at the level of the pixel electrodes 12.

Reference numeral 8 denotes an insulation layer arranged under the high reflection or light shielding layer 7 or 7' and comprising a P-SiO layer (a SiO layer formed by plasma CVD) that is smoothed by means of SOG and another P-SiO layer covering it in order to ensure the insulation effect of the layer 8. The smoothing operation using SOG may be replaced by an operation of forming a P-TEOS film, covering it with a P-SiO film and treating the insulation layer by means of a CMP process.

Reference numeral 9 denotes an insulation layer formed between the pixel electrodes 12 and the high reflection layer 7 and between the electrode layer 12' and the light shielding layer 7' so that the charge holding capacitance of the pixel electrodes is formed by way of this insulation layer. In order to provide a large capacitance, a layer of high permittivity P-SiN, $Ta_2O_5$ or a multilayer structure thereof with $SiO_2$ may be effective if used in place of an $SiO_2$ layer. An insulation layer may preferably be formed to a thickness of 500 to 5,000 angstroms on the high reflection layer.

Otherwise, there are shown a liquid crystal material 14, a common transparent electrode 15, an opposite substrate 16, highly concentrated impurity regions 17, and 17' and an anti-reflection film 20.

As seen from FIG. 1, the highly concentrated impurity layers 17 and 17' formed under the transistors have the polarity same as that of the wells and formed in and around the wells. With this arrangement, high quality images can be displayed if a high amplitude signal is applied to the source because the potential of the wells is securely held to a desired level due to the provision of a low resistance layer. Additionally, the provision of the highly concentrated impurity layers 17 and 17' between the n-type wells and the p-type wells with a field oxide film interposed therebetween makes it unnecessary to arrange a channel stop layer that is normally placed directly under the field oxide film for ordinary MOS transistors.

Since the highly concentrated impurity layers 17, 17' can be formed during the process of preparing the source/drain regions, the number of masks and that of processing steps for forming the layers can be reduced to lower the overall manufacturing cost.

Reference numeral 13 in FIG. 1 denotes an anti-reflection film arranged between the common transparent electrode 15 and the opposite substrate 16 in order to reduce the interface reflectivity in view of the refractivity of the liquid crystal arranged there. The insulation film preferably has a refractivity lower than that of the opposite substrate and also that of the transparent electrode.

Figure 2:
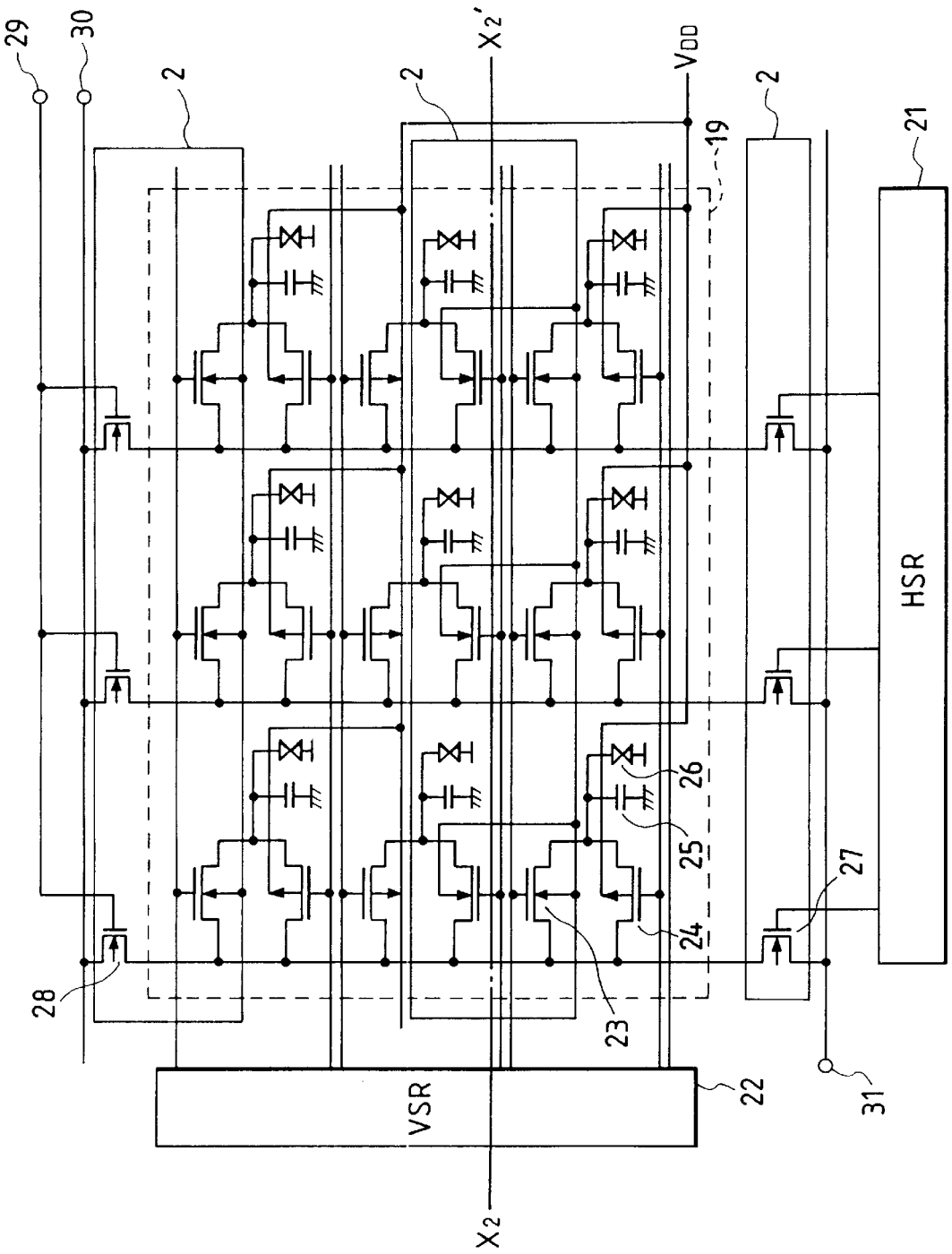
FIG. 2 is a circuit diagram of a pixel electrode substrate according to the invention.

FIG. 2 is a schematic circuit diagram of a liquid crystal display apparatus having a configuration as described above. Referring to FIG. 2, there are shown a horizontal shift register (HSR) 21, a vertical shift register (VSR) 22, n-channel MOSFETs 23, p-channel MOSFETs 24, hold capacitances 25, a liquid crystal layer 26, signal transfer switches 27, reset switches 28, a reset pulse input terminal 29, a reset power supply terminal 30 and a video signal input terminal 31'. Reference numeral 19 denotes a display region.

As shown in FIG. 1, the well region 2 comprises p-type wells, whereas the well region 2' comprises n-type wells. Reference numeral 2 in FIG. 2 denotes a p-type well region. While a p-type semiconductor substrate is used in FIG. 2, the substrate may alternatively be made of an n-type semiconductor material.

The p- and n-type well regions 2 and 2' are preferably implanted with an impurity substance to a concentration level higher than the semiconductor substrate 1. Thus, if the impurity concentration of the semiconductor substrate 1 is between $10^{14}$ and $10^{15}(cm^{-3})$, that of the well region 2 is preferably between $10^{15}$ and $10^{17}(cm^{-3})$.

The source electrodes 10 are connected to the respective data lines by way of which display signals are transmitted, whereas the drain electrodes 11 are connected to the respective pixel electrodes 12. Wires typically made of Al, AlSi, AlSiCu, AlGeCu or AlCu are used for the electrodes 10 and 11. A stable contact can be secured and a reduced constant resistance can be provided by using a barrier metal layer made of Ti and TiN under the electrodes 10 and 11. The pixel electrodes 12 are typically made of a highly reflective material that can provide a smooth surface. Materials that can be used for the pixel electrodes include Al, AlSi, AlSiCu, AlGeCu and AlC that are normally used for wires as well as Cr, Au and Ag. Preferably, the surface of the underlying insulation layer and that of the pixel electrodes 12 are treated by means of a chemical/mechanical polishing (CMP) technique in order to improve their smoothness.

The hold capacitances 25 are those for holding respective signals between the pixel electrodes 12 and the common transparent electrode 15. The potential of the substrate is applied to the well regions 2. The transmission gates of the rows are so configured that the n-channel MOSFETs 23 are located above the respective p-channel MOSFETs 24 on the first row whereas the p-channel MOSFETs 24 are inversely located above the respective n-channel MOSFETs 23 on the second row and so on, i.e. arranged alternately. It should be noted that not only the stripe-shaped wells are held in contact with the power supply line in the periphery of the display region but there are provided fine power supply lines in the display region for ensuring a tight contact.

It should be noted here that the stability of the resistance of the wells is very important for the operation of the display apparatus. Therefore, in this example, the contact area or the number of contacts of the n-wells within the display region is made greater than its counterpart of the p-wells. Since the p-wells are held to a constant potential on the p-type substrate, the substrate plays an important role as a low resistance body. Thus, while the performance of the n-wells arranged like islands may be fluctuated seriously by input and output signals of the sources and drains, such fluctuations are prevented by increasing the number of contacts with the upper wiring layer to ensure high quality images to be displayed on the screen of the liquid crystal panel.

Video signals (including ordinary video signals and pulse-modulated digital signals) are applied to the video signal input terminal 31 to turn on and off the signal transfer switches 27, which output them to the data lines according to the pulse from the horizontal shift register. The vertical shift register 22 applies a high pulse to the gates of the n-channel MOSFETs 23 of the selected row and a low pulse to the gates of the p-channel MOSFETs 24 of that row.

As described above, the switches of the pixel section are constituted by monocrystalline CMOS transmission gates that have an advantage that the signal to be written on the pixel electrodes does not rely on the threshold value of the MOSFETs so that source signals can be written without restrictions. Additionally, since the switches are formed by monocrystalline transistors, they do not show any instability of operation on the boundary areas of the crystal grains of polysilicon TFTs (poly-Si TFTs) to realize a reliable and stable high speed drive operation.

Polysilicon thin film transistors (poly-Si TFTS) may be formed on an insulating glass substrate for a liquid crystal apparatus for the purpose of the invention as will be described below.

Figure 15:
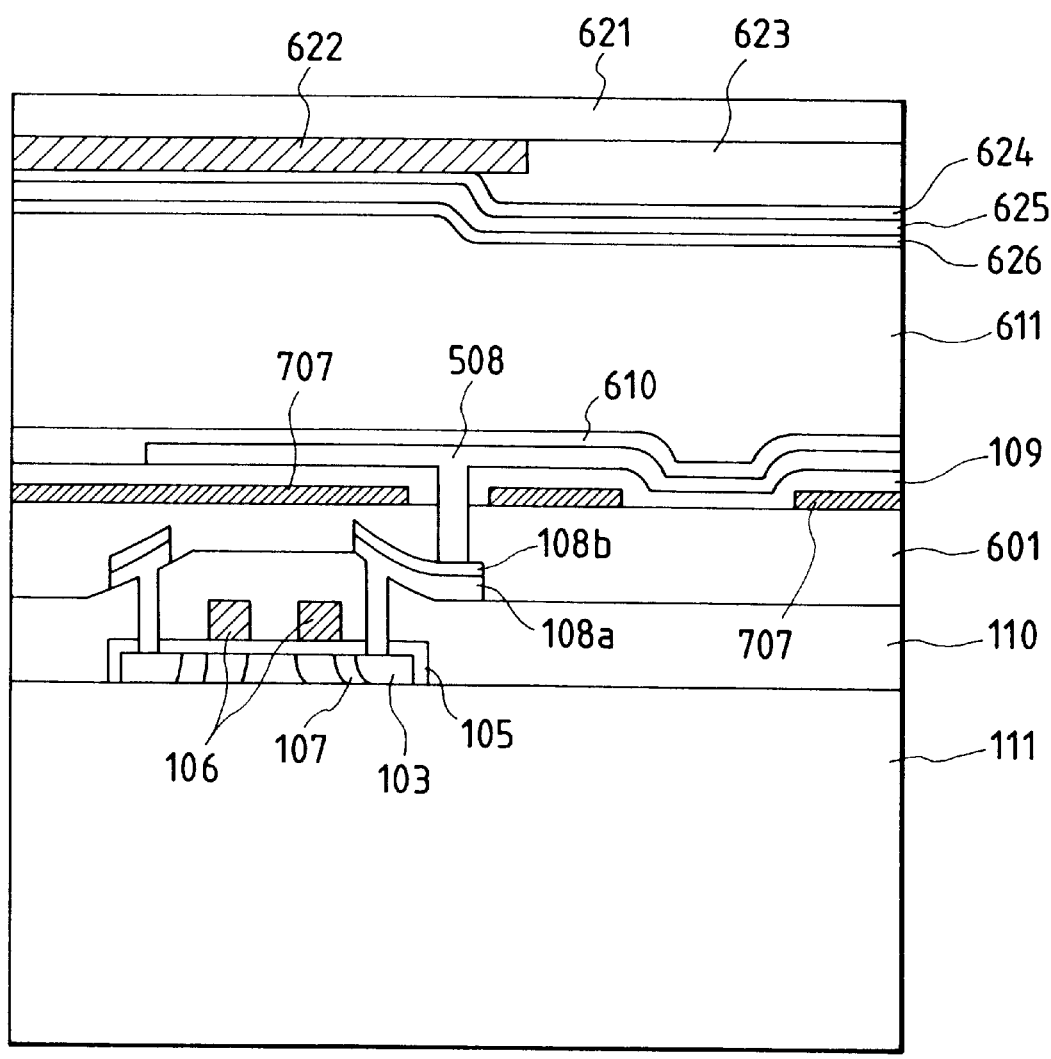
FIG. 15 is a schematic partial cross sectional view of an liquid crystal apparatus, illustrating a step of the process of manufacturing it.

More specifically, a process for preparing poly-Si TFTs for a liquid crystal apparatus will be described by referring to FIG. 15.

Firstly, a glass substrate 111 is subjected to buffer-oxidation. Then, an a-Si film is formed on the substrate to a thickness of about 50 nm by deposition, using an LPCVD technique. Subsequently, the film is turned into a polycrystalline silicon layer 103 by irradiating it with KrF excimer laser. Thereafter, an oxide film 105 is formed to a thickness between 10 and 100 nm for a gate oxide film. After forming gate electrodes 106, sources/drains (152, 103, 107) are formed by means of an ion doping technique. After activating the impurities by annealing in a nitrogen atmosphere, an insulation film 110 is formed to a thickness of about 500 nm. Then, a contact hole is produced for each transistor device by patterning and then wiring layers 108a, 108bare formed typically by sequentially depositing a TiN film by sputtering for layer 108a and an Al—Si film also by sputtering for layer 108b and then patterning the two film layers simultaneously. Thereafter, a reflection layer 707 is deposited by sputtering and patterned and then an insulation film 109 is formed for a capacitance by decomposing a mixture gas of silane gas with ammonia gas or $N_2O$ gas in plasma and depositing the decomposition product at temperature between 200 and 400° C. Subsequently, the polycrystalline silicon is thermally treated for hydrogenation in hydrogen gas or in a mixture gas of hydrogen gas and inert gas such as nitrogen gas at 350 to 500° C. for 10 to 240 minutes. After forming a through hole for each device, ITO 508 is formed for a transparent electrode. Then, liquid crystal 611 is injected into the gap between the substrate and the opposite electrode. The opposite substrate is prepared typically by sequentially arranging a black matrix 622, a color filter 623, a transparent common electrode of ITO 624, a protection film 625 and an orientation film 626.

In an experiment, the mobility and the leak current of the produced poly-Si TFTs could be suppressed to 60 $cm^2$/V·sec and $10^{-10}$A respectively. Thus, a liquid crystal display apparatus comprising poly-Si TFTs according to the invention is power saving and can be prepared with a small chip surface area.

Now, the peripheral circuits of the display panel will be described by referring to FIG. 3.

Figure 3:
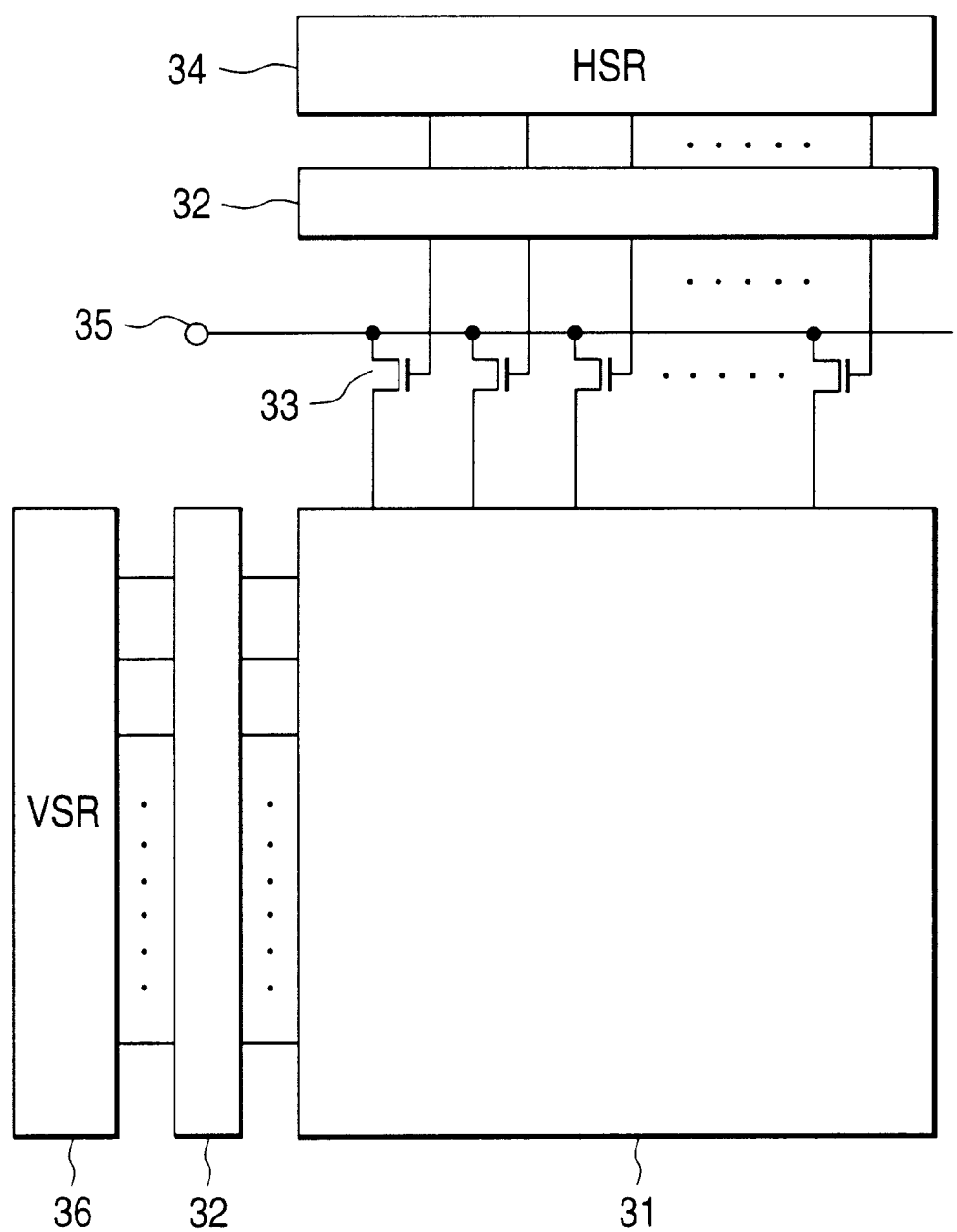
FIG. 3 is a schematic circuit diagram of a liquid crystal apparatus according to the invention and including peripheral circuits.

FIG. 3 is a schematic block diagram of the peripheral circuits.

In FIG. 3, there are shown a level shifter circuit 32, video signal sampling switches 33, a horizontal shift register (HRS) 34, a video signal input terminal and a vertical shift register (VSR) 36.

With the above circuit arrangement, the logic circuits including the horizontal and vertical shift registers can be driven with a low voltage of 1.5 to 5V to realize a quick and low voltage operation regardless of the video signal amplitude. Both the horizontal and vertical shift registers (HSR, VSR) can be scanned in opposite directions by means of a selection switch so that the panel does not need any alterations to make itself adapted to the positional arrangement of the optical system and hence to different products to a great advantage of the panel particularly in terms of the manufacturing cost of such products. While the video signal sampling switches 33 in FIG. 3 comprise unipolar transistors, they may alternatively comprise different devices to write an input video signal to all the signal lines by means of CMOS transmission gates.

When CMOS transmission gates are used, their operation may be fluctuated by video signals depending on the area of the NMOS gates and that of the PMOS gates as well as on the difference between the overlap capacitance of the gates and that of the source/drain regions. However, this problem can be prevented and a video signal can be written on the signal lines by connecting the sources and the drains of MOSFETs having a gate length equal to a half of that of the MOSFETs of the sampling switches 33 of the corresponding polarities to the respective signal lines and applying a pulse with the opposite phase. With this arrangement, images of higher quality can be displayed on the screen of the display panel.

Figure 4:
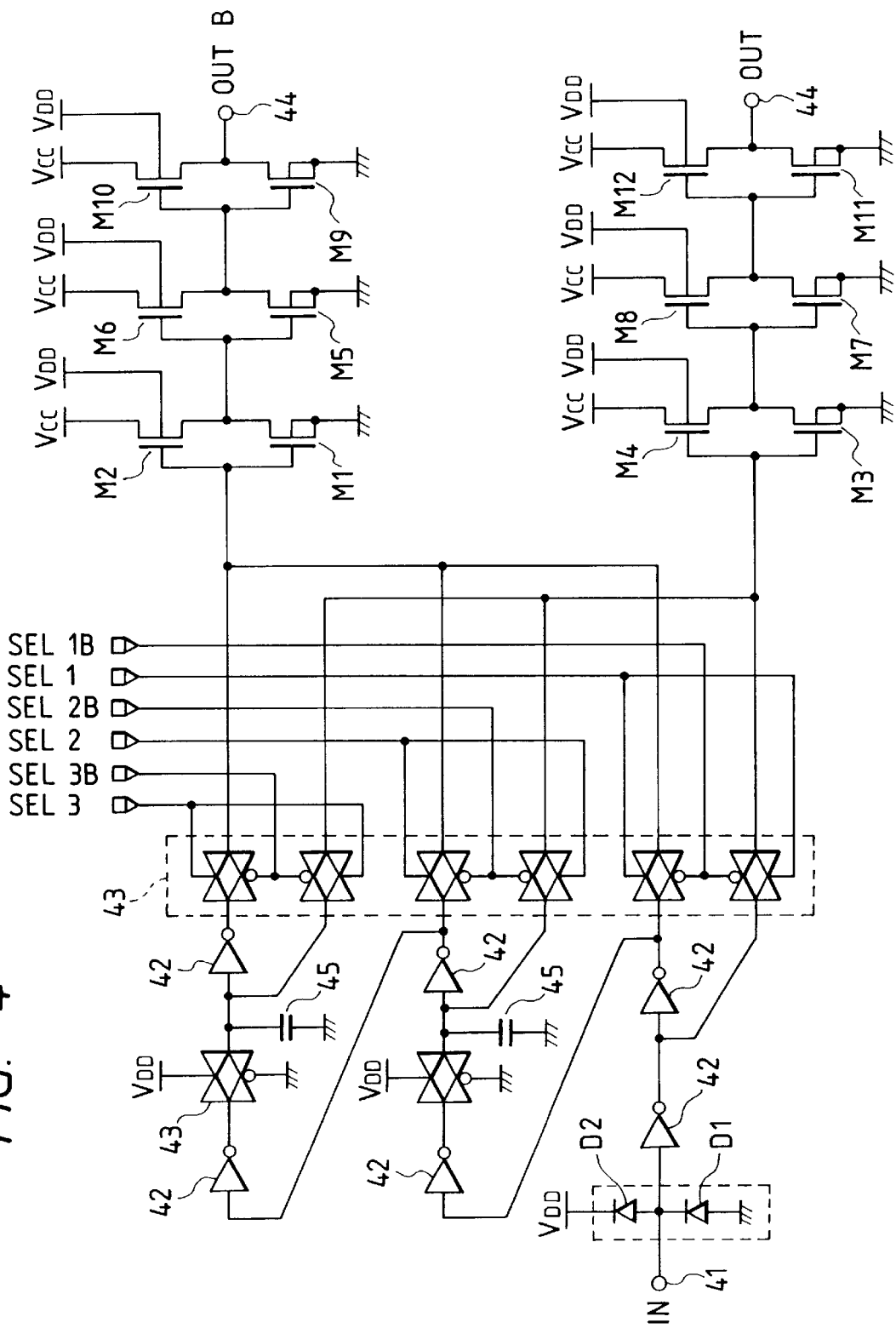
FIG. 4 is a circuit diagram of a circuit for accurately synchronizing a video signal and a sampling pulse.

Now, a method for accurately synchronizing a video signal and a sampling pulse will be described by referring to FIG. 4. To achieve this objective, the delay amount of the sampling pulse have to be varied. Referring to FIG. 4, there are shown pulse delaying inverters 42, switches 43 for selecting one of the pulse delaying inverters, output terminals 44 for an output with a controlled delay amount (OUT B representing an opposite phase output and OUT representing an in-phase output), capacitances 45 and a protect ion circuit 46.

By a combined use of any of SEL1 (SEL1B: SEL1B being an inverted signal of SEL1) through SEL3 (SEL3B: SEL3B being an inverted signal of SEL3), a sampling pulse can be made to pass through a selected number of delaying inverters 42.

Due to the synchronous circuit built in the display panel, if the symmetry of an externally applied pulse is damaged for some reason attributable to jigs in terms of delay amount for the three panels of red, green and blue of the display panel, the symmetry can be recovered by means of said selection switches to display clear images that are free from color breakups of red, blue and green due to phase shifts of the pulse in a high frequency band. Alternatively, the delay amount can be regulated by means of temperature correction using the temperature measured by a built in diode and a stored reference table.

Now, the liquid crystal panel of liquid crystal display apparatus according to the invention will be described in terms of the components and the liquid crystal substance. The flat liquid crystal panel of FIG. 1 is configured with an opposite substrate and its common electrode substrate 16 is made to show undulations in order to prevent reflections at the interface with the common transparent electrode 15 arranged on a surface of the substrate 16. The common electrode substrate 16 is provided on the opposite surface thereof with an anti-reflection film 20. These components may be made to show undulated profiles by polishing them with fine sands in order to improve the contrast of the displayed images.

Polymer network liquid crystal PNLC is used for the liquid crystal of this panel, although polymer dispersion liquid crystal PDLC may alternatively be used as polymer network liquid crystal. Polymer network liquid crystal PNLC can be produced by means of a polymerization phase separation technique, where a solution of liquid crystal and a polymeric monomer or oligomer is prepared and injected into a cell with a known technique and then the liquid crystal and the polymer are phase-separated by means of UV polymerization to form a polymer network in the liquid crystal. PNLC contains liquid crystal to a large extent (70 to 90 wt %).

Scattering of light can be increased in PNLC when nematic liquid crystal having a highly anisotropic refractivity ($\Delta n$) is used for it. A low voltage drive is made possible by the use of nematic liquid crystal having a dielectrically highly anisotropic property ($\Delta \epsilon$). Scattering of light can be made strong enough for achieving a sharp contrast for the display of images when the size of the polymer network expressed in terms of the distance between the centers of adjacent meshes is between 1 and 1.5($\mu$m).

Figure 5:
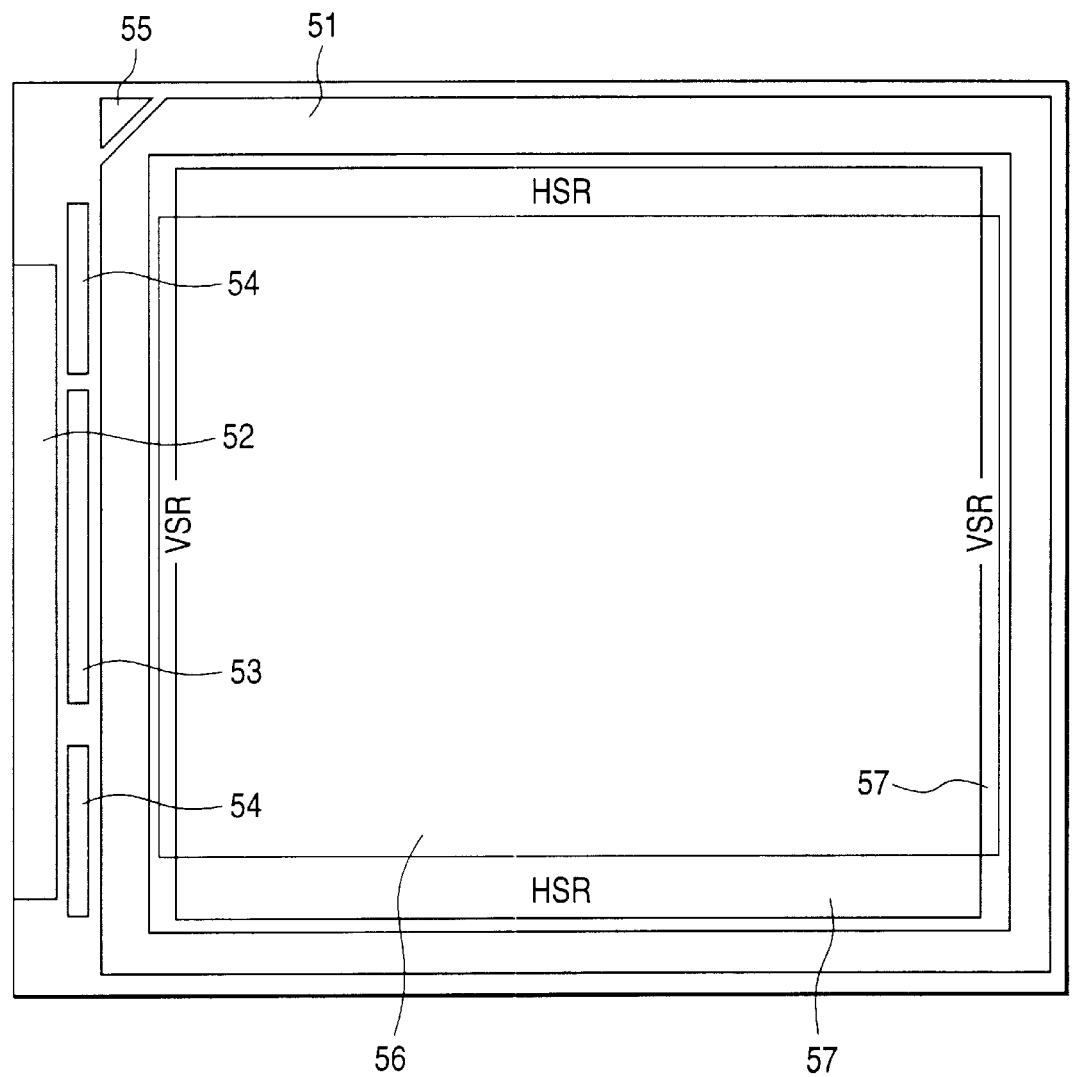
FIG. 5 is a schematic plan view of a liquid crystal panel, showing its relationship with the sealing arrangement.

Now, the relationship between the sealing arrangement and the configuration of the panel will be described by referring to FIG. 5. In FIG. 5, there are shown a sealing member 51, an electrode pad unit 52, a clock buffer circuit 53 and an amplifier 54, which amplifier operates as an output buffer to be used for an electric test of the panel. Otherwise, there are also shown an Ag paste sections 55 that show an electric potential same as that of the opposite substrate, a display section 56 and a peripheral circuit section 57 typically comprising SR (shift registers and other devices. As seen from FIG. 5, circuits are arranged both inside and outside of the seal in order to reduce the overall chip size. While all the pads that are arranged on a lateral side of the panel, they may alternatively be arranged on the top or bottom side of the panel or on two or more than two sides of the panel for handling a high speed clock efficiently.

When preparing an liquid crystal apparatus by using an Si substrate, the electric potential of the substrate can fluctuate to give rise to operational failures of the panel if a strong beam of light emitted from a projector strikes one or more than one lateral walls of the substrate. Therefore, it is highly desirable that the peripheral circuit sections at the top and the lateral sides of the panel are realized in the form of substrate holders that can shield light. Additionally, the Si substrate is preferably provided on the rear surface thereof with a plate of a metal having a high thermal conductivity such as Cu that is adhered to the substrate by means of an adhesive agent also having a high thermal conductivity, the metal plate operating as a holder.

Now, the configuration of and the method of preparing pixel electrodes 12 and an electrode layer 12' will be described.

As shown in FIG. 1, the pixel electrodes 12 and the electrode layer 12' can be realized in the form of perfectly flat reflection electrodes by means of chemical-mechanical polishing (CMP). With a CMP technique, unlike the ordinary method of patterning a metal layer and polishing the patterned metal, after forming electrode forming grooves for an electrode pattern by etching in an insulated region and producing a metal layer there, the metal in areas other than the electrode pattern is removed by polishing while the metal in the electrode pattern is flattened to the level of the insulated region. While this technique is applicable to wires having a large width relative to the remaining areas of the region, it is accompanied by a following disadvantageous problem as will be described below.

In short, polymer can be deposited on the wires to obstruct the patterning operation during the etching process if ordinary etching equipment is used. The polymer may presumably consist of reaction products of the sputtering and etching operations and gases existing in the atmosphere.

Figure 6A:
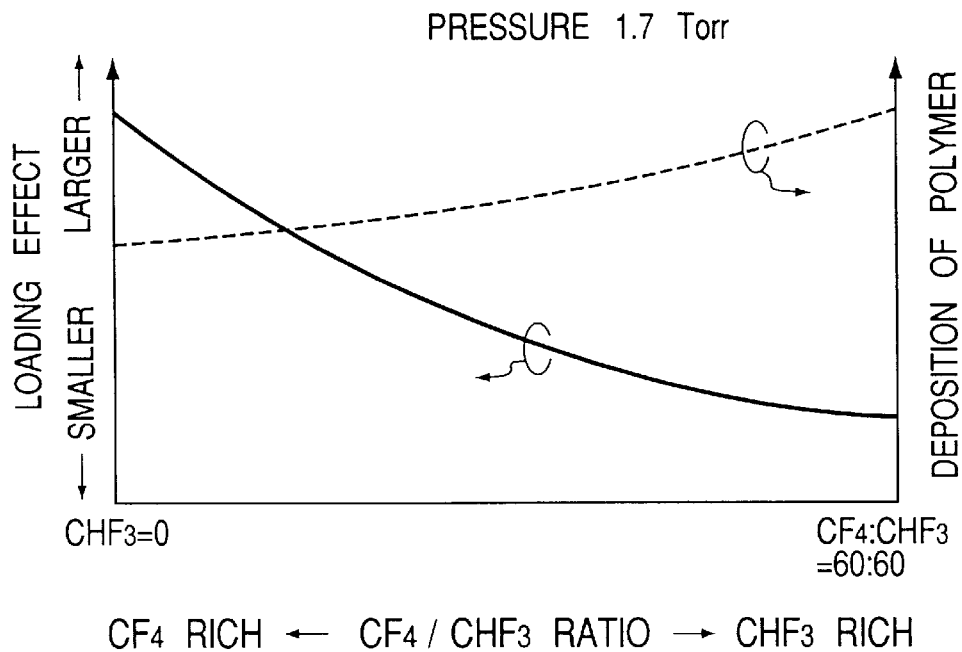
FIGS. 6A and 6B are graphs for determining the acceptability and non-acceptability of an etching operation to be used for manufacturing a liquid crystal apparatus according to the invention.
Figure 6B:
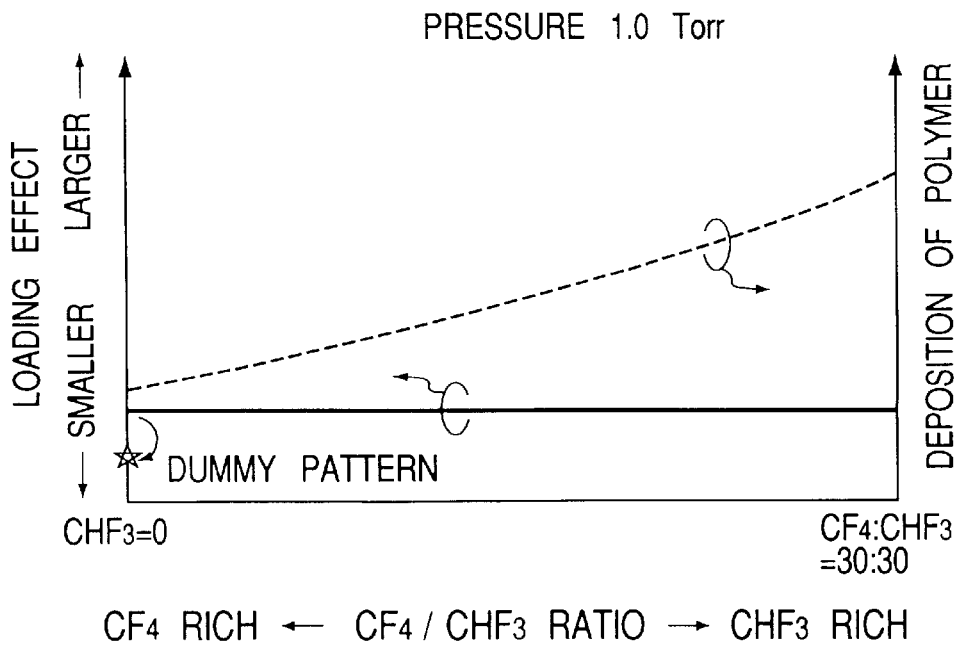

In view of this problem, the etching conditions of an oxide film type ($CF_4/CHF_3$ type) etching operation were studied in an experiment conducted by the inventors of the present invention. FIGS. 6A and 6B are graphs showing some of the results of the experiment. FIG. 6A illustrates the effect of an etching process using a total pressure of 1.7 Torr, whereas FIG. 6B shows that of an etching process using a total pressure of 1.0 Torr, which is designed for the purpose of the invention.

It will be seen from FIG. 6A that, while the polymer deposit is reduced by reducing the concentration of easily depositable $CHF_3$ gas under the total pressure of 1.7 Torr, the dimensional discrepancies (loading effect) of the patterns located relatively close to the resist and those located remotely from the resist remarkably increase to make the process unfeasible.

On the other hand, it will be appreciated from FIG. 6B that, with the etching process designed for the purpose of the invention, the loading effect can be significantly suppressed when the pressure is gradually reduced until it gets to below 1 Torr and a remarkable etching effect can be obtained by using only $CF_4$, eliminating the use of $CHF_3$.

Additionally, with the arrangement of forming pixel electrodes 12 only in the display region, it was found that grooves are formed by etching only in the insulation layer of the display region so that practically no resist exists in the display regions, whereas the peripheral areas are occupied by resist. It is practically impossible to produce such a structure unless electrodes 12' having a profile similar to that of the pixel electrodes 12 are formed in the peripheral areas of the display region.

With this arrangement, the step between the display section and the peripheral areas or the sealing member typically observed in known comparable display apparatus is eliminated and the gaps of the apparatus are dimensioned accurately to achieve an uniform pressure to be applied to the entire surface area and reduce any uneven injection of liquid crystal, resulting in a high yield of manufacturing liquid crystal display apparatus that can display high quality images.

Figure 7:
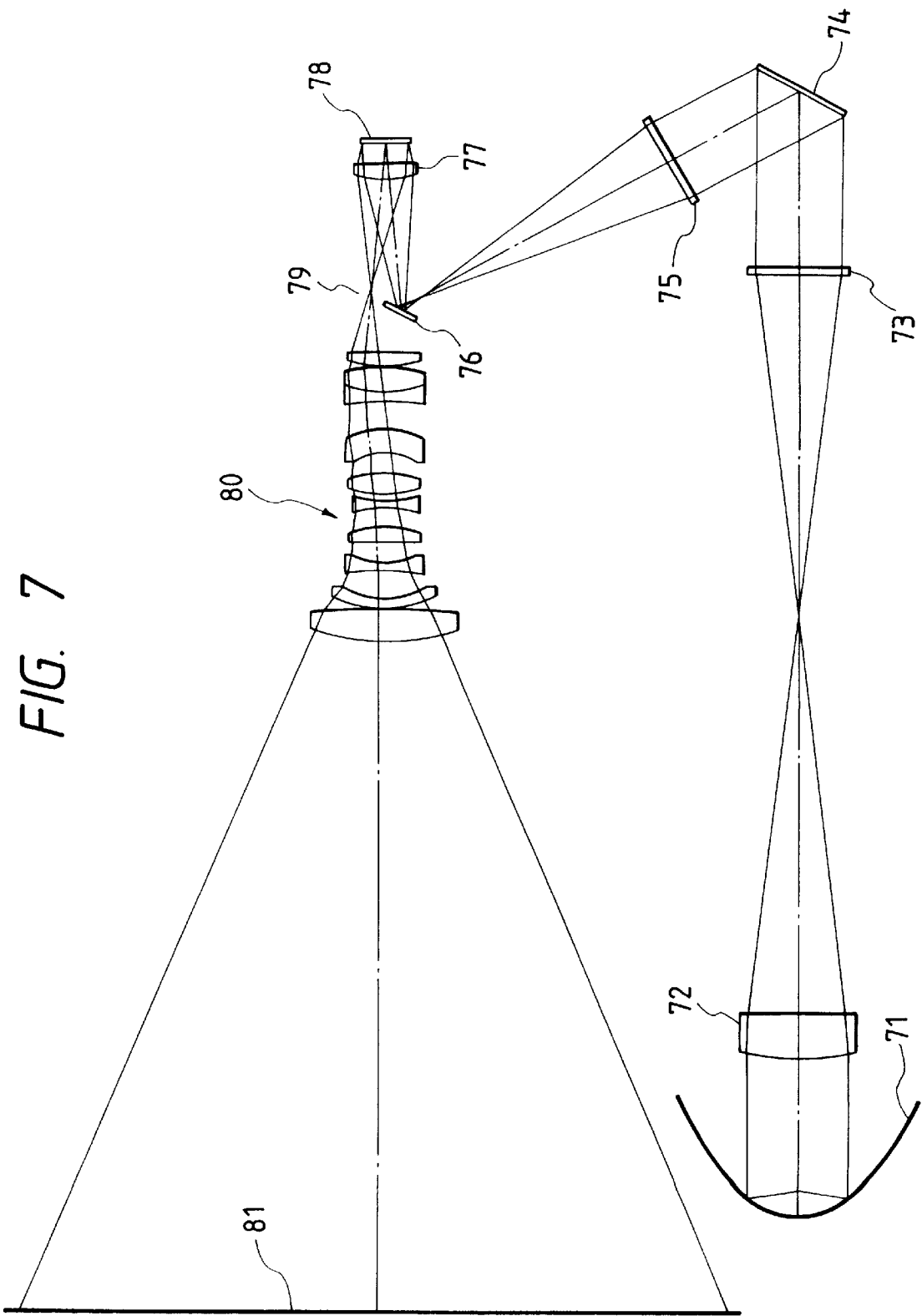
FIG. 7 is a schematic illustration of an optical system comprising a reflection type liquid crystal apparatus according to the invention.

Now, an optical system that can be used in a reflection type liquid crystal panel according to the invention will be described by referring to FIG. 7. In FIG. 7, there are shown a light source 71, a focusing lens 72 for producing a focused image of the light source, Fresnel lenses 73 and 75 and a color separation optical device 74 which is preferably a dichroic mirror or a diffraction grating.

The optical system further comprises a mirror 76 for leading the separated red, green and blue beams of light to respective R, G and B panels, a view lens 77 for illuminating the panel with parallel rays of light obtained by collimating focused beams, a reflection type liquid crystal apparatus 78 and an iris (not shown) located at position 79. Reference numeral 80 denotes a projection lens and reference numeral 81 denotes a screen typically of a double-layered structure comprising a Fresnel lens for collimating projected light and a lenticular lens for expanding the viewing angle vertically and horizontally. While only a single panel of single color is shown in FIG. 7 for simplicity, a total of three panels of three primary colors are actually provided, although it may be appreciated that a single panel arrangement may feasibly be used in place of the three panels when a micro lens array is formed on the surface of the reflection panel to cause different incident rays of light to strike respective pixel regions. As a voltage is applied to the liquid crystal layer of the liquid crystal apparatus 78, incident light is regularly reflected by the pixels and then passes the iris located at position 79 before it is projected onto the screen 81.

On the other hand, incident light striking the reflection type liquid crystal apparatus 78 when no voltage is being applied to the liquid crystal layer and the latter is in a scattered state will be isotropically scattered and hence no light will strike the projection lens 80 except scattered rays of light that are directed toward the aperture of the iris located at position 79 so that consequently the display screen remains evenly dark. As will be appreciated from the above description of the optical system, since no polarizing plate is required for it and the signal light is reflected by the entire surface of the pixel electrode having a high reflectivity before it strikes the projection lens, the display panel can provide a degree of brightness that is twice to three times higher than that of any known comparable display panel.

The noise component of light is minimized and a high contract display capability is provided since anti-reflection measure is taken on the surface of the opposite substrate and the interface thereof in this example. Additionally, all the optical devices (lenses, mirrors and so on) can be downsized to reduce the manufacturing cost and the weight of the display apparatus because the panel is adapted to dimensional reduction.

Any unevenness or fluctuations in the colors and the brightness on the display screen due to the unevenness or fluctuations in the colors and the brightness of the light source can be eliminated by inserting a (fly eye lens type or rod type) integrator between the light source and the optical system.

Figure 8:
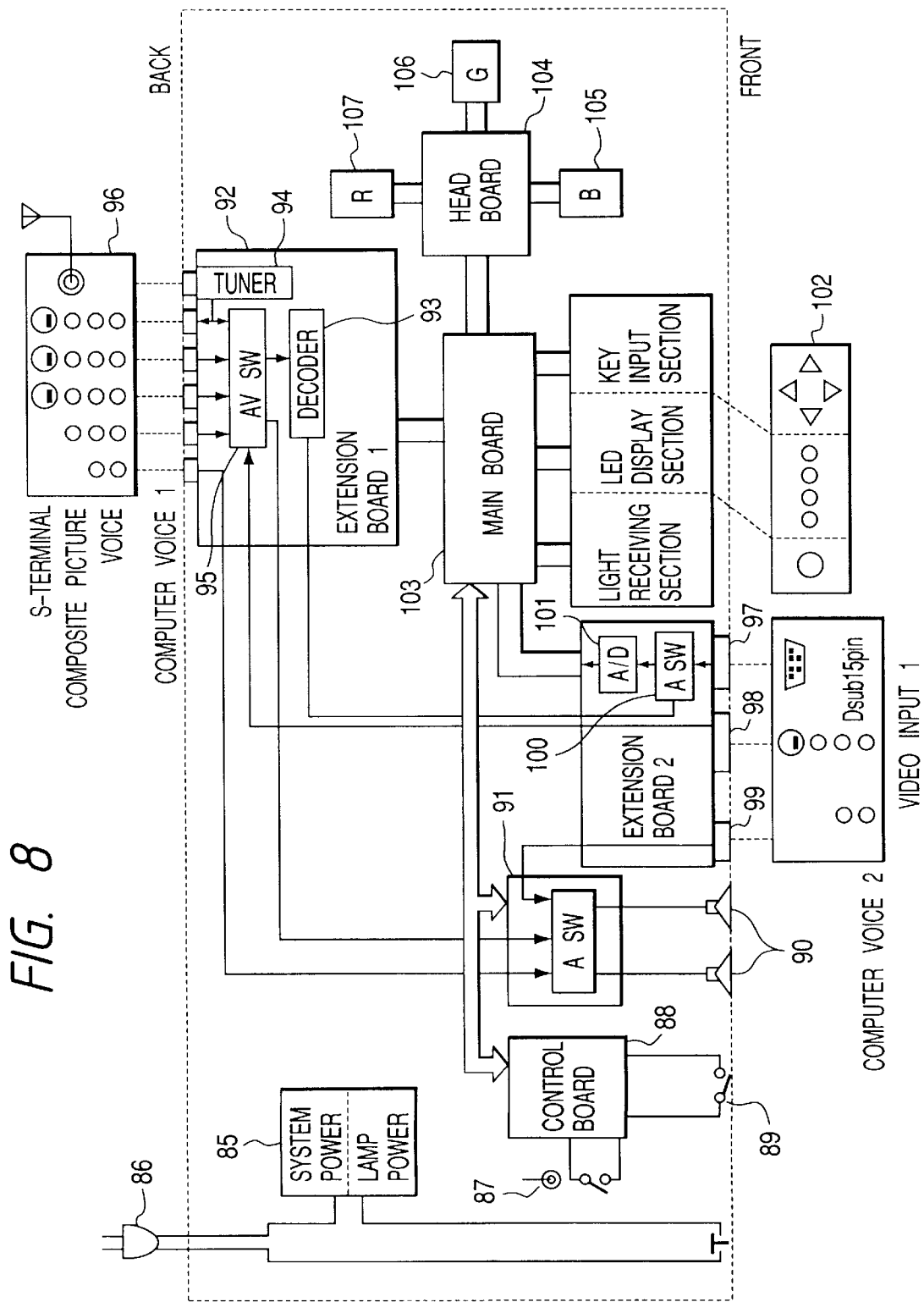
FIG. 8 is a schematic block diagram of the peripheral circuits of a reflection type liquid crystal apparatus according to the invention.

FIG. 8 is a schematic block diagram of the peripheral electric circuits other than the panel.

In FIG. 8, there are shown a power source unit 85 that comprises a power source for lamps and a system power source for driving the panel and the signal processing circuits, a plug 86, a lamp temperature sensor 87 for detecting any abnormal temperature of any of the lamps, a control board 88 for deenergizing any lamps showing abnormal temperature, and a filter safety switch 89 for deenergizing any failed devices other than lamps. For example, an attempt for opening the high temperature lamp housing box of the apparatus will fail because of the safety measure provided to obstruct the attempt. Otherwise, there are also shown a speaker 90, an audio-board 91 that can be provided with a built-in processor for 3-D sound and surround sound effects, an extension board 92, or extension board 1, comprising input terminals connected to an external apparatus 96 for providing signals including those from S-terminals, composite pictures and voices, selection switches 95 for selecting one or more than one appropriate signals and a tuner 94. Signals are transmitted from the extension board 1 to extension board 2 by way of a decoder 93. The extension board 2 comprises Dsub 15 pin terminals connected to separate signal sources such as video recorders and/or computers and signals applied to it by way of a switch 100 are converted into digital signals by means of an A/D converter 101.

Reference numeral 103 denotes a main board comprising a memory and a CPU as principal components. NTSC signals that have been A/D converted are stored in the memory so that missing signals may be generated by interpolation in order to allocate them appropriately to a large number of pixels and signals may be subjected to processing operations suited for a liquid crystal apparatus including gamma transformation, edge emphasis, brightness regulation and bias regulation. Besides NTSC signals, computer signals may be subjected to processing operations including resolution conversion if the panel is a high resolution XGA panel and VGA signals are provided. In addition to the operation of processing picture data, the main board operates for synthetically combining a plurality of picture data NTSC signals with computer signals. The output signal of the main board is subjected to a serial/parallel conversion to take a form that is less affected by noise before it is transmitted to a head board 104, where the signal is once again subjected to a parallel/serial conversion and then to a D/A conversion and written onto panels 105, 106 and 107 according to the number of video lines of the panels by way of an amplifier. Reference numeral 102 denotes a remote control panel that allows a computer display to be manipulated in a simple manner like a T V display. As described above, a display apparatus according to the invention can display fine and clear images because high quality images can be obtained by processing images that are not highly resolvable.

Now, a so-called single panel type full color display apparatus comprising a liquid crystal apparatus (panel) that is provided with micro lenses will be described.

The applicant of the present patent application proposed a new display panel in Japanese Patent Application No. 9-72646 to solve the problem that the mosaic arrangement of R, G and B pixels is noticeable to the viewer to degrade the quality of the image displayed on the screen of known display panels that are provided with micro lenses. The display panel proposed in Japanese Patent Application No. 9-72646 comprises a pixel unit array obtained by arranging a set of pixel units at a predetermined pitch, each pixel unit comprising three pixels of a first color, a second color and a third color, in which the first color pixel and the second color pixel are arranged in a first direction and the first color pixel and the third color pixel are arranged in a second direction different from the first direction, so that the two pixels arranged in the first direction shares the pixel of the first color with the two pixels arranged in the second direction, and a plurality of micro lenses arranged on the pixel unit array on the substrate at a pitch corresponding to the pitch of pixel arrangement in the first direction and that of pixel arrangement in the second direction. Now, a display panel proposed in the above cited Japanese Patent Application No. 9-72646 is applied to a liquid crystal apparatus and a display apparatus according to the invention.

Figure 16C:
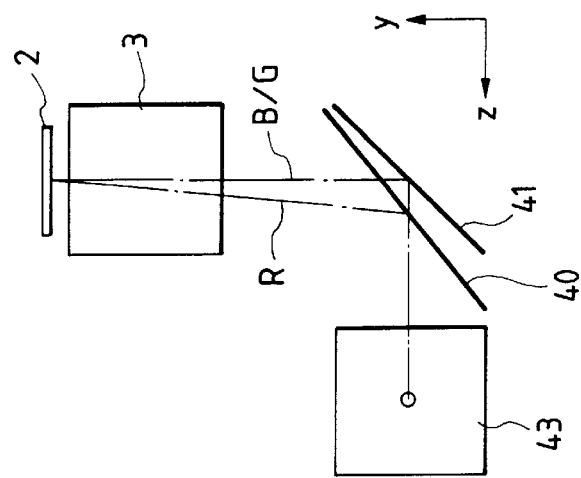
FIGS. 16A, 16B and 16C are schematic illustrations showing a projection type display apparatus according to the invention.
Figure 16A:
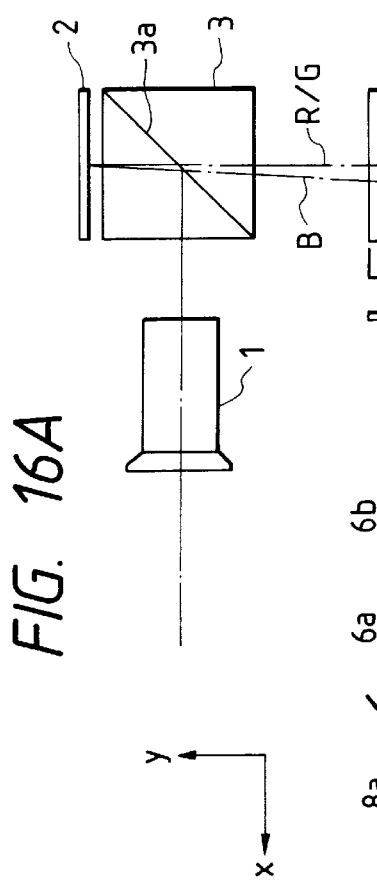
Figure 16B:
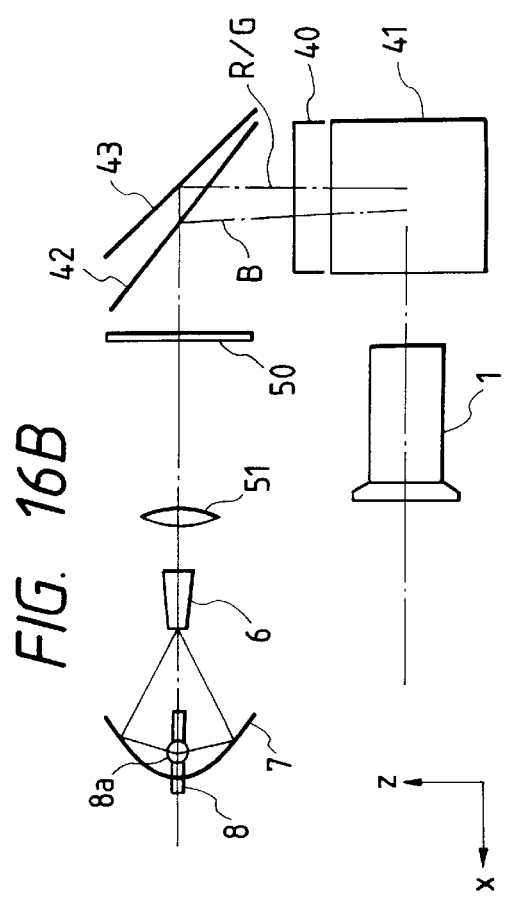

FIGS. 16A to 16C are schematic illustrations of the optical system of a projection type liquid crystal display apparatus comprising a display panel, showing only a principal area thereof. Note that FIG. 16A is a plan view, FIG. 16B is a front view and FIG. 16C is a side view.

Referring to FIGS. 16A to 16C, the optical system comprises a projection lens 1 for projecting the pixel data displayed on display panel (liquid crystal panel) 2 that comprises a liquid crystal apparatus provided with micro lenses onto a predetermined plane, a polarized beam splitter (PBS) 3 typically designed to transmit S-polarized beams and reflect P-polarized beams, an R (red light) reflecting dichroic mirror 40, a B/G (blue and green light) reflecting dichroic mirror 41, a B (blue light) reflecting dichroic mirror 42, a high reflection mirror 43 for reflecting beams of all colors, a Fresnel lens 50, a concave lens (positive lens) 51, a rod type integrator 6, an elliptic reflector 7 and an arc lamp (light source) 8 such as a metal hallide or a UHP having its light emitting plane 8a located at the center of the reflector 7.

Figure 17A:
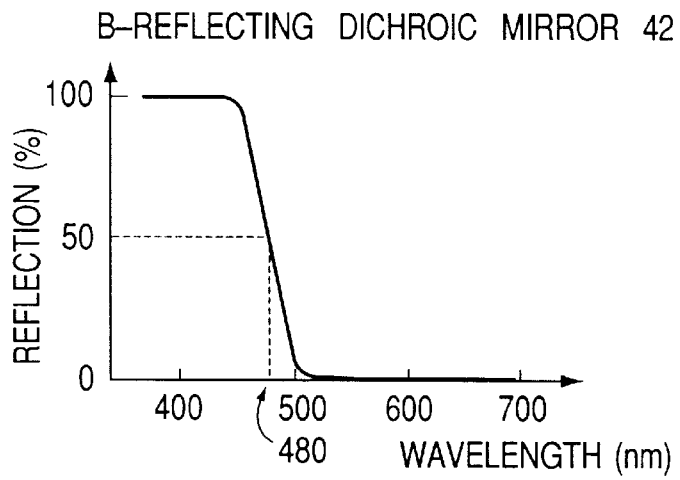
FIGS. 17A, 17B and 17C are graphs showing the spectral reflection characteristics of the dichroic mirrors that can be used in a projection type display apparatus according to the invention.
Figure 17B:
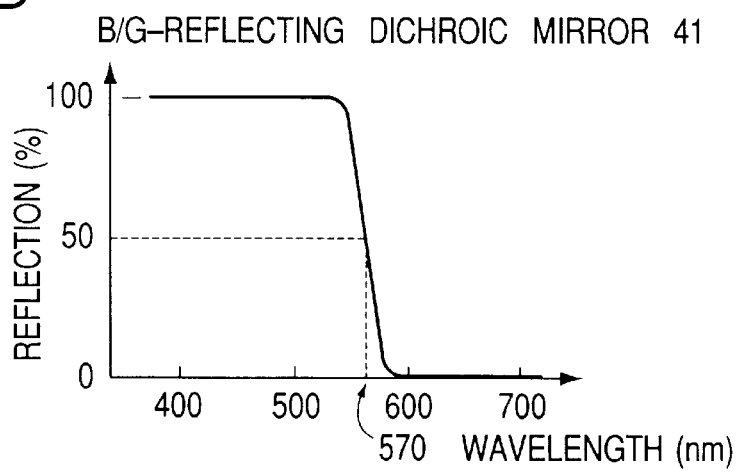
Figure 17C:
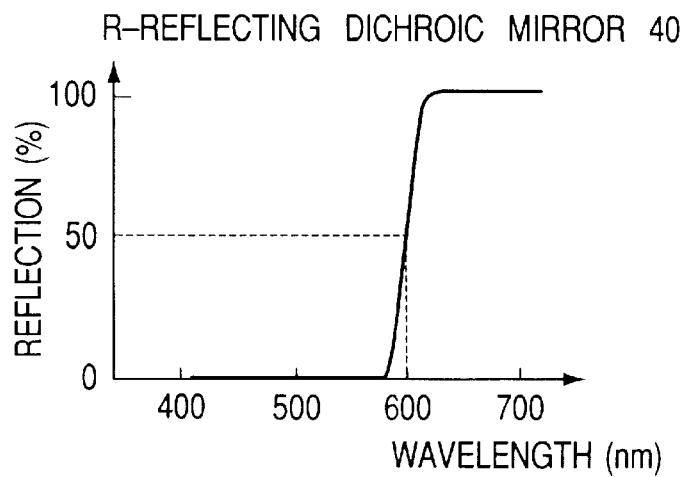

The R (red light) reflecting dichroic mirror 40, the B/G (blue and green light) reflecting dichroic mirror 41, and the B (blue light) reflecting dichroic mirror 42 have spectral reflection characteristics as illustrated in FIGS. 17A, 17B and 17C respectively.

Figure 18:
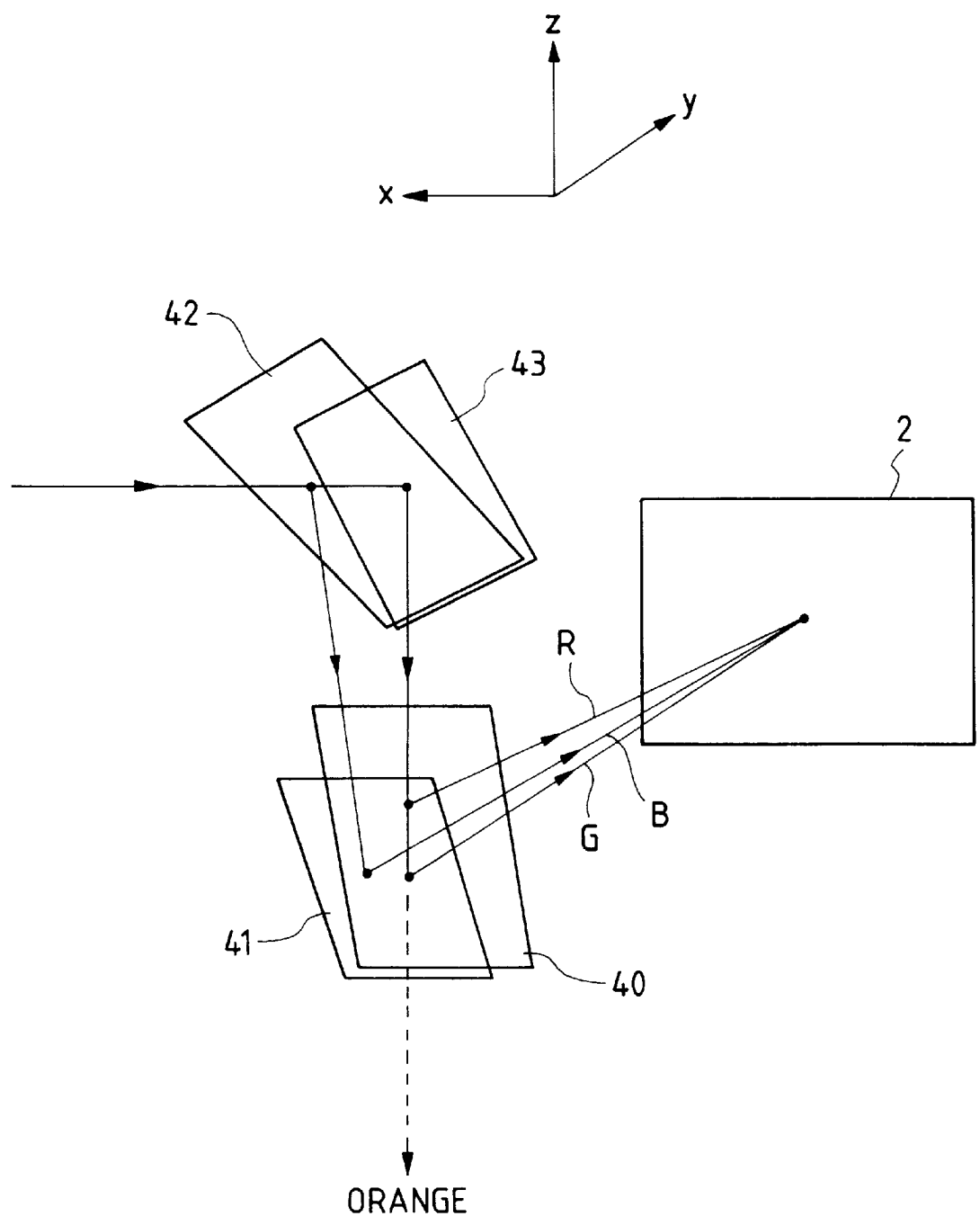
FIG. 18 is schematic illustration of the color separation/ illumination section of a projection type display apparatus according to the invention.

The dichroic mirrors are arranged three-dimensionally with the high reflection mirror 43 as shown in FIG. 18 in order to divide the white illumination light from the power source 8 into three primary colors of R, G and B and illluminate the liquid crystal panel 2 with rays of light of three primary colors three-dimensionally from different respective directions as will be described in greater detail hereinafter.

The flux of light from the light source 8 proceeds in a manner as described below. Firstly, the white flux of light emitted from the lamp 8 is focused to the entrance (incident light striking plane) 6a of the integrator 6 by the elliptic reflector 7 arranged upstream relative to it and then passes through the integrator 6, while being repeatedly reflected in the latter, to obtain a uniform spatial intensity distribution. The flux of light coming out of the exit 6b of the integrator 6 is then transformed into a parallel flux running along the x-axis (as shown in FIG. 16B) by means of the concave lens 51 and the Fresnel lens 50 before it gets to the B reflecting dichroic mirror 42.

Only rays of B light (blue light) are reflected downward by the B-reflecting dichroic mirror 42 and directed toward the R-reflecting dichroic mirror 40 with a predetermined angle relative to the z-axis (as shown in FIG. 16B). Meanwhile, the remaining rays of light of red and green (R/G light) pass through the B-reflecting dichroic mirror 42 and reflected rectangularly by the high reflection mirror 43 into the direction of the z-axis and also directed toward the R-reflecting dichroic mirror 40.

Thus, both the B-reflecting dichroic mirror 42 and the high reflection mirror 43 are so arranged as to reflect the flux of light coming from the integrator 6 (along the x-axis) downwardly along the z-axis in FIG. 16B and the high reflection mirror 43 is inclined by 45° from the x-y plane around the y-axis, whereas the B-reflecting dichroic mirror 42 is inclined by an angle smaller than 45° from the x-y plane around the y-axis.

As a result, while the R/G rays of light reflected by the high reflection mirror 43 is directed toward the R-reflecting dichroic mirror 40 exactly along the z-axis, the B rays of light reflected by the B-reflecting dichroic mirror 42 is directed downwardly toward the R-reflecting dichroic mirror 40 along a path tilted by a predetermined angle relative to the z-axis (a tilt in the x-z plane) in FIG. 16B. The positional shift and the angular tilt of the B-reflecting dichroic mirror 42 from the high reflection mirror 43 are so determined as to make the rays of light of the three colors intersect each other on the liquid crystal panel 2 in order to cause both B light and R/G light to cover a same and identical area on the liquid crystal panel 2.

Then, the rays of R/G/B light directed downward (in the direction of z-axis) in FIG. 16B move toward the R-reflecting dichroic mirror 40 and the B/G-reflecting dichroic mirror 41, which mirrors are located below the B-reflecting dichroic mirror 42 and the high reflection mirror 43. More specifically, the B/G-reflecting dichroic mirror 41 is inclined by 45° relative to the x-z plane around the x-axis, whereas the R-reflecting dichroic mirror 40 is inclined by an angle smaller than 45° relative to the x-z plane around the x-axis.

Thus, of the incident rays of R/G/B light, only those of B/G light are transmitted through the R-reflecting dichroic mirror 40 and reflected rectangularly by the B/G-reflecting dichroic mirror 41 into the positive direction of the y-axis before they are polarized by the PBS 3 to illuminate the liquid crystal panel 2 arranged horizontally on the x-z plane.

As described above (see FIGS. 16A and 16B), since the rays of B light proceed with a predetermined angle (the tilt in the x-z plane) relative to the x-axis, they also maintain a predetermined angle (the tilt in the x-z plane) relative to the y-axis after being reflected by the B/G-reflecting dichroic mirror 41 and illuminate the liquid crystal panel 2 with an angle of incidence (along the x-y plane) equal to that angle. On the other hand, the rays of G light is reflected rectangularly by the B/G-reflecting dichroic mirror 41 into the positive direction of the y-axis before they are polarized by the PBS 3 to illuminate the liquid crystal panel 2 perpendicularly with an angle of incidence equal to 0°.

Meanwhile, the rays of R light is reflected by the R-reflecting dichroic mirror 40 arranged upstream relative to the B/G-reflecting dichroic mirror 41 into the positive direction of the y-axis in a manner as described, showing a predetermined angle relative to the y-axis (the tilt in the y-z plane) as illustrated in FIG. 16C, before they are polarized by the PBS 3 to illuminate the liquid crystal panel 2 with an angle of incidence (along the y-z plane) equal to that angle.

As described above, the positional shift and the angular tilt of the B/G-reflecting dichroic mirror 41 from the R-reflecting dichroic mirror 40 are so determined as to make the rays of light of the three colors of R, G and B intersect each other on the liquid crystal panel 2 in order to cause both R light and B/G light to cover a same and identical area on the liquid crystal panel 2.

As shown in FIGS. 17A to 17C, the cut-off wavelength of the B/G-reflecting dichroic mirror 41 is 570 nm and that of the R-reflecting dichroic mirror 40 is 600 nm so that the rays of orange light are discarded out of the optical path after transmitting through the B/G-reflecting dichroic mirror 41 to provide an optimal balance of colors.

As will be described hereinafter, the rays of R, G and B light are reflection/polarization modulated by the liquid crystal panel 2 and reflected back to the PBS 3, which by turn reflects them into the positive direction of the x-axis by means of the PBS surface 3a and causes them to strike the projection lens 1. The projection lens 1 enlarges the image displayed on the liquid crystal panel 2 before it projects the image on the screen (not shown).

Since the rays of R, G and B light strike the liquid crystal panel 2 with respective angles of incidence that are different from each other, the reflected rays of R, G and B light also shows different angles. Therefore, the projection lens 1 is required to have a large diameter and a large aperture in order to take in all of them without missing any portion thereof. It should be noted that any angle of inclination of the flux of light striking the projection lens 1 is corrected as light of primary colors is collimated after passing through the micro lenses twice to maintain the angle of incidence at the liquid crystal panel 2.

Figures 28, 29:
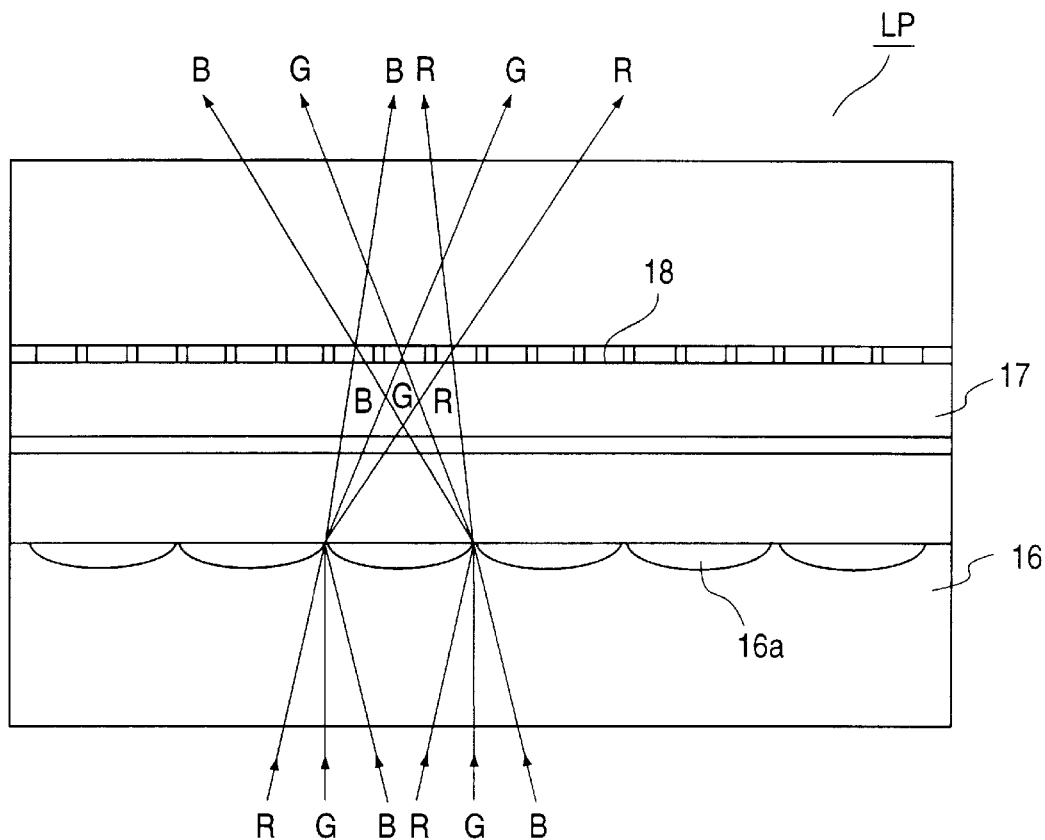
FIG. 28 is an enlarged schematic partial cross sectional side view of a known transmission type liquid crystal panel comprising micro lenses.
FIG. 29 is an enlarged schematic partial view of a projected image obtained by a known projection type display apparatus realized by using a transmission type liquid crystal panel comprising micro lenses.

On the other hand, with a known transmission type liquid crystal panel LP illustrated in FIG. 28, the flux of light leaving the liquid crystal panel LP is spread out partly due to the focusing effect of the micro lens array 16 so that the projection lens is required to have a large numerical aperture and hence a large diameter to accommodate the spread out flux of light.

In FIG. 28, reference numeral 16 denotes a micro lens array obtained by arranging a number of micro lenses 16a at a predetermined pitch and reference numerals 17 and 18 respectively denote a liquid crystal layer and pixels of the three primary colors of R(red), G(green) and B(blue).

Rays of light of R, G and B are made to illuminate the liquid crystal panel LP with respective angles of incidence that are different from each other so that rays of light of different colors are received respectively by the pixels 18 of the corresponding colors due to the focusing effect of the micro lenses 16a. This arrangement makes the use of color filters unnecessary and provides a display panel that exploits light highly efficiently. Thus, a projection type display apparatus provided with such a display panel can display clear and bright color images if it comprises a single liquid crystal panel.

However, a known projection type display apparatus comprising a display panel that is provided with a micro lens array as described above has a drawback that the pixels 18 of the three primary colors of R, G and B are enlarged and projected on the screen with the image being displayed there to make the mosaic arrangement of the R, G and B pixels clearly visible to the viewer to degrade the quality of the image displayed on the screen.

Contrary to this, the flux of light coming from the liquid crystal panel 2 of this example shows only a relatively limited spread so that a clear and bright image can be projected onto the screen by means of a projection lens having a relatively small numerical aperture. Such a projection lens will naturally show small dimensions and the mosaic arrangement of R, G and B pixels can be made by far less visible.

Figure 19:
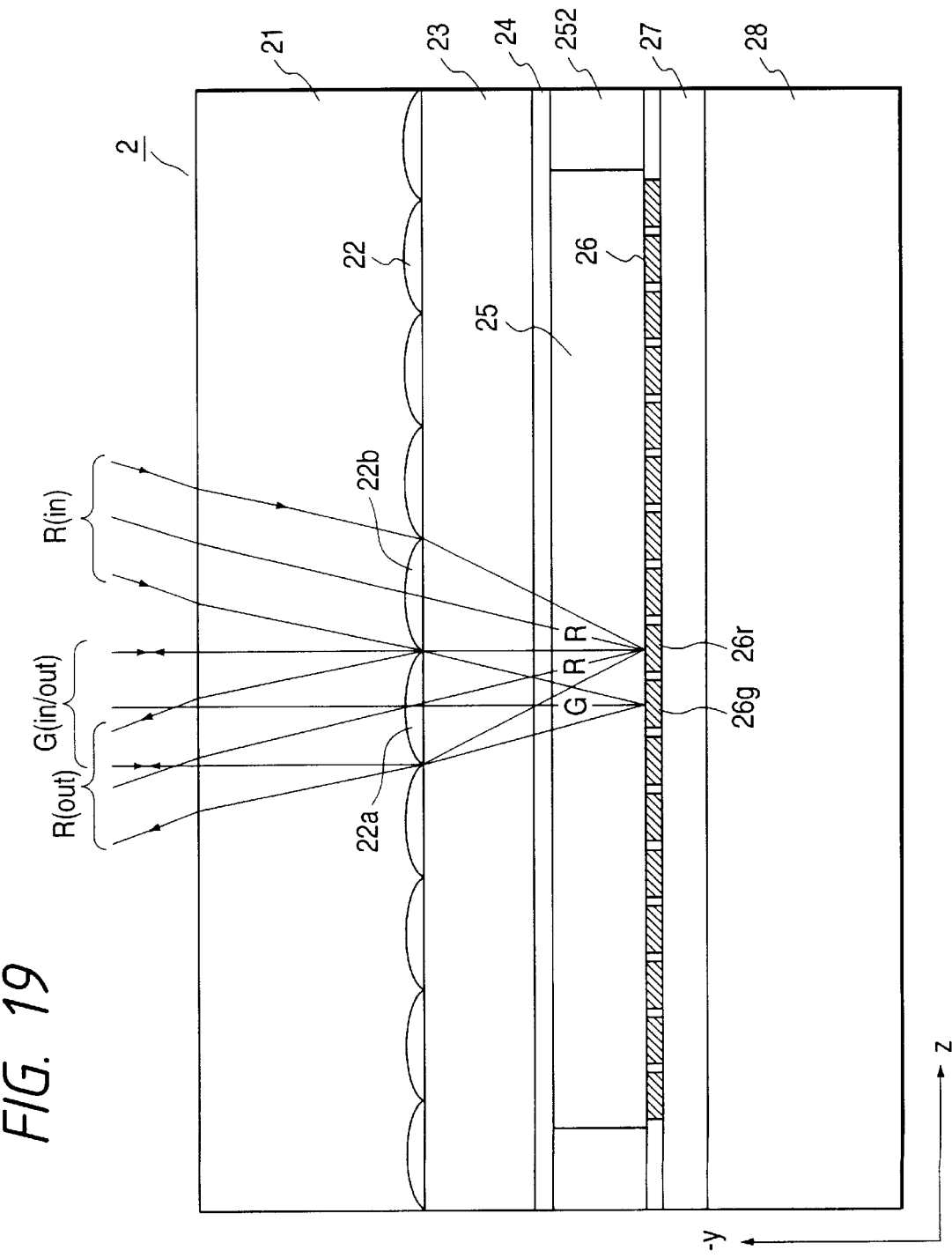
FIG. 19 is a schematic cross sectional view of a liquid crystal panel according to the invention.

Now, the liquid crystal panel 2 of this example will be described further. FIG. 19 is an enlarged schematic sectional view of the liquid crystal panel 2 of this example. In FIG. 19, the reflection layer that involves a characteristic feature of the present invention is not expressly shown, since the feature is described above in detail.

Referring to FIG. 19, it comprises a micro lens substrate (glass substrate) 1, micro lenses 22, a sheet glass 23, a transparent opposite electrode 24, a liquid crystal layer 25, pixel electrodes 26, an active matrix drive circuit 27 and a silicon semiconductor substrate 28. The micro lenses 22 are formed on the surface of the glass substrate (alkali type glass) 21 by means of an ion exchange method at a pitch twice as large as that of the pixel electrodes 26 to show a tow-dimensional array, which is referred to as micro lens array.

The liquid crystal layer 25 is formed by ECB mode nematic liquid crystal such as DAP or HAN that is adapted to a reflection type display panel and held to an oriented state by means of an orientation layer (not shown). The pixel electrodes 26 are made of Al (aluminum) and designed to operate also as so many reflectors as they are subjected to a CMP process after a patterning operation in order to improve the surface condition and their reflectivity.

The active matrix drive circuit 27 is arranged on the silicon substrate 28 and comprises both a horizontal driver circuit and a vertical driver circuit. It is designed to write video signals of the three primary colors of R, G and B respectively on the R, G and B pixel electrodes 26. While the pixel electrodes 26 do not comprise any color filters, they are discriminated as R, G and B pixels by the video signals of the primary colors written by the active matrix drive circuit 27 so that they form an R, G, B pixel array as will be described hereinafter.

Firstly, G light will be described as part of light illuminating the liquid crystal panel 2. As described earlier, principal rays of G light are polarized by the PBS 3 before they strike the liquid crystal panel 2 perpendicularly. Note that only a ray of G light striking a micro lens 22a is shown in FIG. 19 by arrow G(in/out).

As shown, rays of G light striking the micro lens 22a are focused by the lens 22a and illuminate G pixel electrode 26g made of Al, which reflects them and drives them to pass through the same micro lens 22a and go out of the liquid crystal panel 2. As the rays of G light reciprocatingly move through the liquid crystal layer 25, they are modulated by the action of the liquid crystal caused by the electric field that is formed between the G pixel electrode 26g and the opposite electrode 24 as a signal voltage is applied thereto before the rays return to the PBS 3. The quantity of light reflected by the PBS surface 3a and directed toward the projection lens 1 varies depending on the extent of modulation so that an image with different densities of light and different gradations will be displayed by the pixels.

Rays of R light falling aslant along the y-z plane are polarized by the PBS 3 before they strike the micro lens 22b as indicated by arrow R(in) in FIG. 19. Then, they are focused by the micro lens 22b and illuminate R pixel electrode 26r located slightly left relative to the position right below the lens 22b, which pixel electrode 26r reflects them and drives them to pass through a neighboring micro lens 22a and go out of the liquid crystal panel 2 (R(out)).

The (polarized) rays of R light are also modulated by the action of the liquid crystal caused by the electric field that is formed between the R pixel electrode 26r and the opposite pixel electrode 24 as a signal voltage is applied thereto before they move out of the liquid crystal panel 2 and return to the PBS 3. Thereafter, they are projected onto the display screen as part of the image to be displayed there in a manner as described above by referring to the rays of G light.

While the rays of G light striking the G pixel electrode 26g and those of R light striking the R pixel electrode 26r may seem to interfere with each other in FIG. 19, it is simply because the liquid crystal layer 25 is disproportionally enlarged there in terms of its thickness. In actual terms, the liquid crystal layer 25 has a thickness of 5 μm at most, which is very small relative to the sheet glass 23 having a thickness between 50 and 100 μm and hence such interference does not take place regardless of the size of each pixel.

Figure 20A:
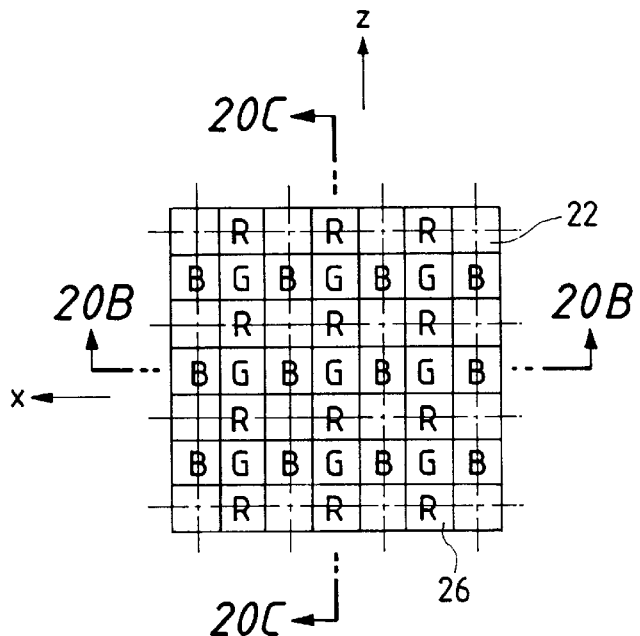
FIGS. 20A, 20B and 20C are illustrations showing the underlying principle of color separation and color synthesis for a liquid crystal panel according to the invention.
Figure 20C:
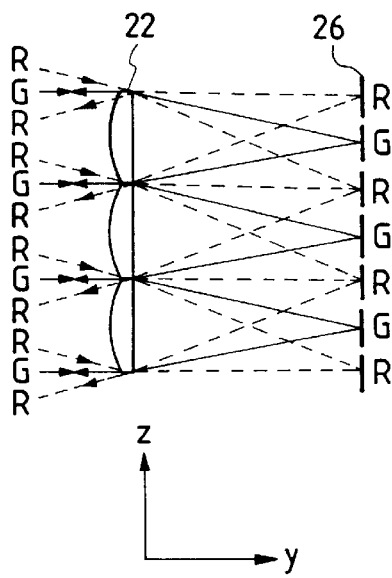
Figure 20B:
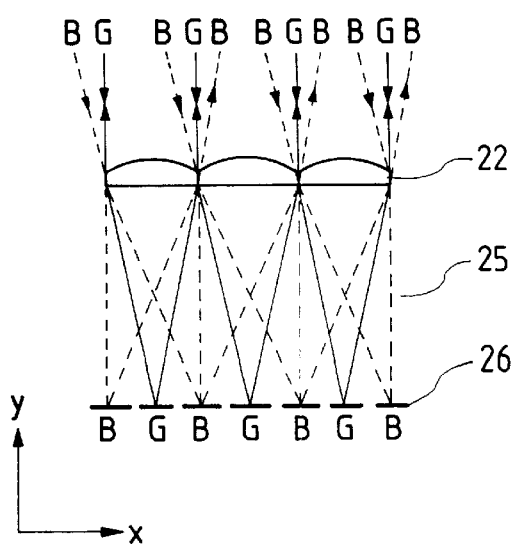

FIGS. 20A to 20C illustrate how color separation and color synthesis are carried out for the purpose of the invention. Note that FIG. 20A is a schematic plan view showing the upper surface of the liquid crystal panel 2 and FIGS. 20B and 20C are cross sectional views taken along line 20B—20B (the x-direction) and along line 20C—20C (z-direction) respectively.

It will be appreciated that FIG. 20C corresponds to FIG. 19 as they are taken along the y-z plane and show rays of G and R light entering and leaving the respective micro lenses 22. It will also be appreciated that the G pixel electrodes are located directly below the corresponding micro lenses 22 as primary pixel electrodes, whereas the R pixel electrodes are located directly below the respective boundaries of the micro lenses 22 as secondary pixel electrodes. Thus, the angle of incidence θ of R light is preferably so selected that tan θ is equal to the ratio of the pitch of pixel arrangement to the distance between the micro lens array 22 and the pixel electrode array 26.

On the other hand, FIG. 20B is a cross sectional view taken along the x-y plane of the liquid crystal panel. It will be seen that the B pixel electrodes that are ternary pixels are alternately arranged with the G pixel electrodes as in the case of FIG. 20C, wherein the G pixel electrodes are located directly below the corresponding micro lenses 22, whereas the B pixel electrodes are located directly below the respective boundaries of the micro lenses 22 as ternary pixels.

Since rays of B light illuminating the liquid crystal panel 2 strike the panel aslant (along the x-y plane) after they are polarized by the PBS 3 as described above, those coming from the micro lenses 22 are reflected by the respective B pixel electrodes and go out respectively from the adjacent micro lenses as viewed in the x-direction as shown in FIG. 20B. The mode of modulation of the liquid crystal layer 25 on the B pixel electrodes and the mode of projection of B light of the liquid crystal panel 2 are same as those described above in terms of G and R light.

The B pixel electrodes are located directly below the respective boundaries of the micro lenses 22 and, therefore, the angle of incidence θ of B light is preferably so selected that tan θ is equal to the ratio of the pitch of pixel arrangement (of the G and B pixels) to the distance between the micro lens array 22 and the pixel electrode array 26.

Thus, in the liquid crystal panel 2 of this example, the R, G and B pixels are arranged in the order of RGRGRG . . . along the z-direction (first direction) and in the order of BGBGBG . . . along the z-direction (second direction). FIG. 20A shows how they appear when viewed from above.

As described above, each of the pixels have a length equal to a half of that of each of the micro lenses 22 in either direction so that the pixels are arranged at a pitch equal to a half of the pitch of arrangement of the micro lenses 22 along the x- and z-directions. When viewed from above, it will be seen that the G pixels are located directly below the centers of the respective micro lenses 22, whereas the R pixels are located between the corresponding G pixels along the z-direction and directly below the respective boundaries of the micro lenses 22 and the B pixels are located between the corresponding G pixels along the x-direction and directly below the respective boundaries of the micro lenses 22. Each micro lens has a rectangular contour whose sides are twice as long as the corresponding sides of a pixel.

Figure 21:
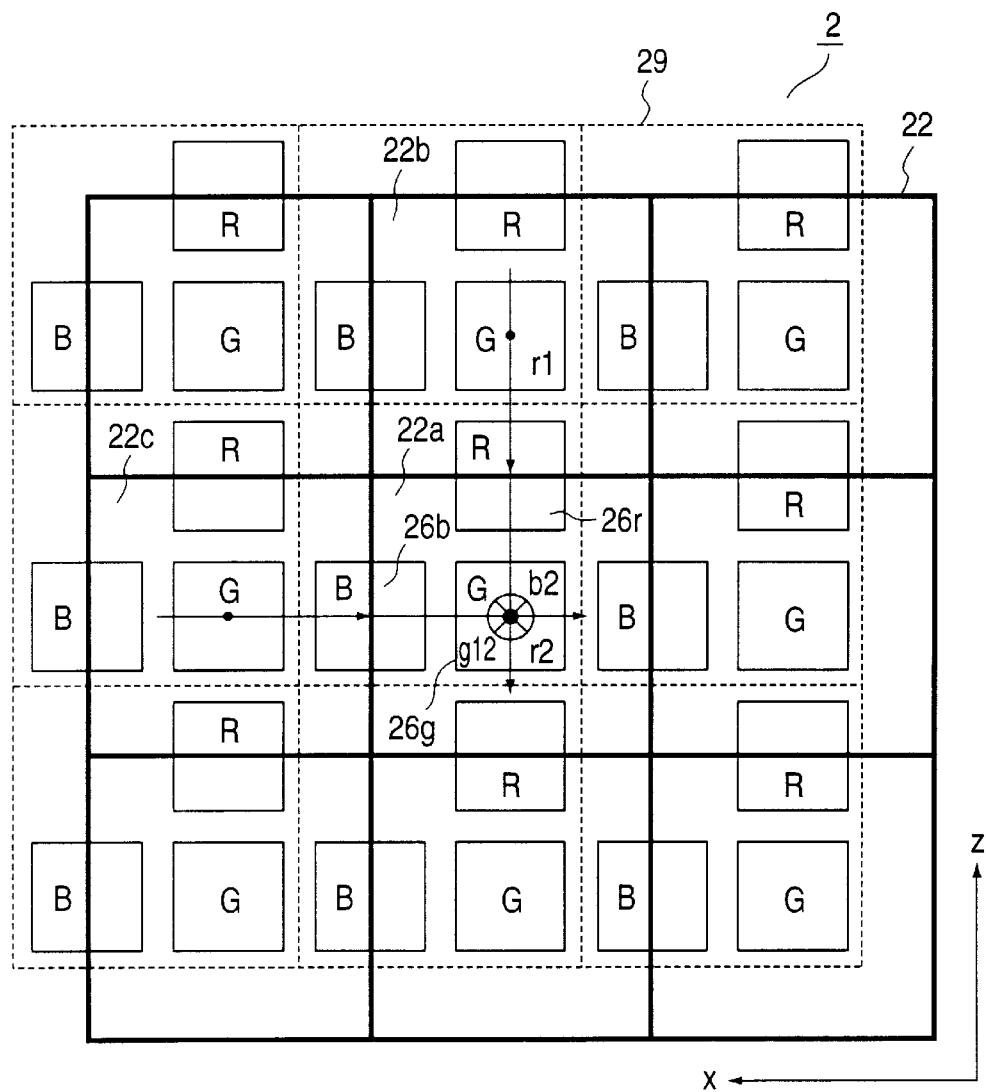
FIG. 21 is an enlarged schematic partial plan view of a liquid crystal panel according to the invention.

FIG. 21 is an enlarged schematic partial plan view of the liquid crystal panel 2. The lattice of broken lines in FIG. 21 define pixel units of R, G and B pixels for displaying images.

The pixel units are arranged two-dimensionally at a predetermined pitch on the substrate to produce a pixel unit array. In other words, when the R, G and B pixels are driven by the active matrix drive circuit 27 of FIG. 19, the R, G and B pixels of each pixel unit defined by the lattice of broken lines 29 are driven by respective R, G and B video signals that correspond to the location of the pixel unit.

Let us take a single pixel unit comprising a R pixel electrode 26r, a G pixel electrode 26g and a B pixel electrode 26b here. As indicated by arrow r1, the R pixel electrode 26r is illuminated by rays of R light coming aslant from the micro lens 22b, which rays of R light are then reflected to move out through the micro lens 22a as indicated by arrow r2. Similarly, the B pixel electrode 26b is illuminated by rays of B light coming aslant from the micro lens 22c as indicated by arrow b1, which rays of B light are then reflected to move out through the micro lens 22a as indicated by arrow b2.

On the other hand, the G pixel electrode 26g is illuminated by rays of G light coming perpendicularly from the micro lens 22a (relative to the FIG. 21) as indicated by arrow g12, which rays of G light are then reflected back to move out perpendicularly through the micro lens 22a.

Thus, with the liquid crystal panel 2 of this example, while rays of light of the primary colors strike each of the pixel units respectively with different angles of incidence, they leave the pixel unit by way of a same micro lens (micro lens 22a in the above described example).

Figure 22:
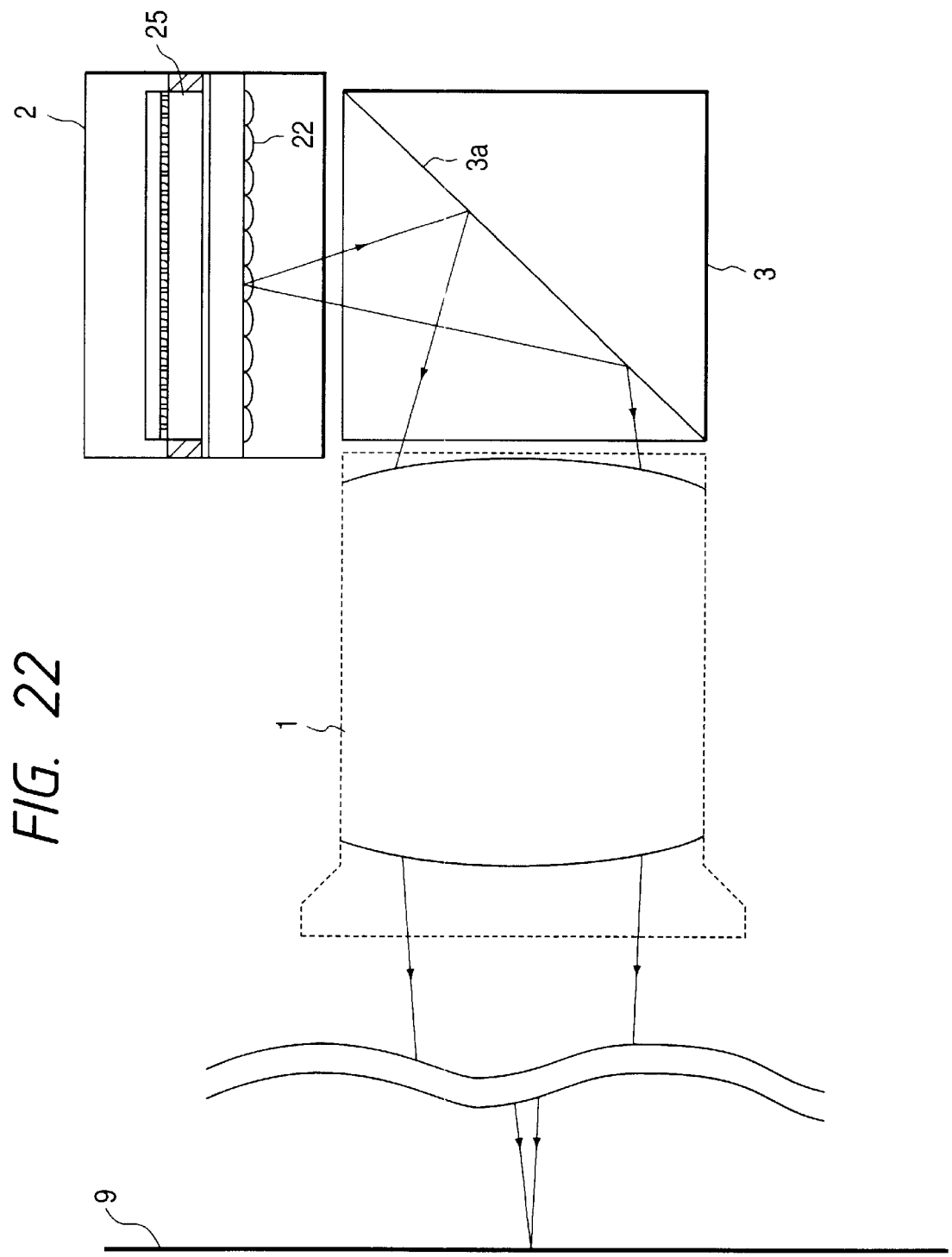
FIG. 22 is a schematic illustration of the projection optical system of a projection type display apparatus according to the invention.
Figure 24:
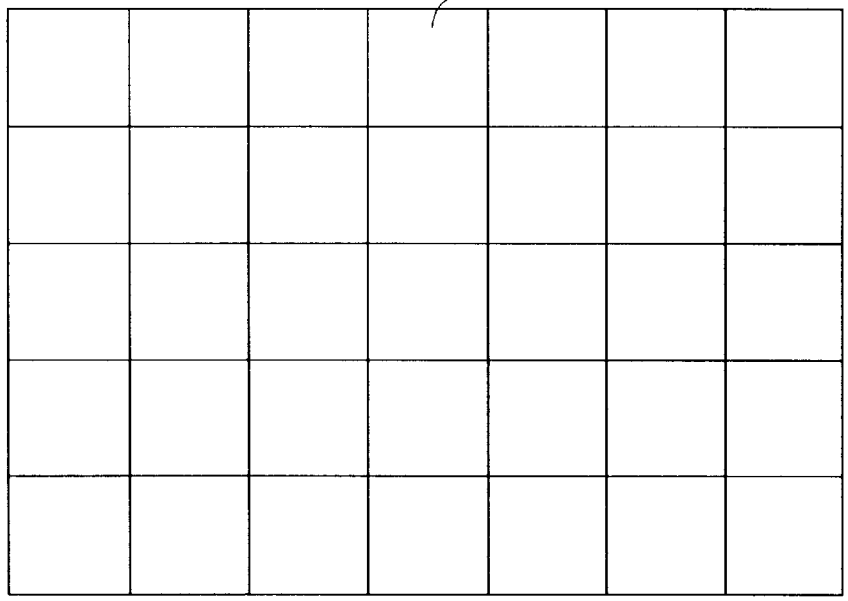
FIG. 24 is an enlarged schematic view of an image projected on the display screen of a projection type display apparatus according to the invention.

FIG. 22 is a schematic illustration showing how all the rays of light coming from the liquid crystal panel 2 are projected onto the screen 9 by way of the PBS 3 and the projection lens 1. A liquid crystal panel 2 as illustrated in FIG. 21 is used here. When the optical system is so regulated that an image of the micro lenses 22 and/or a neighboring area in the liquid crystal panel 2 are focused and projected on the display screen 9, the rays of light emitted from the R, G and B pixels of each pixel unit are mixed with each other on the corresponding area of the lattice of the micro lenses 22 to reproduce the original colors as shown in FIG. 24.

In this example, a display panel as shown in FIG. 21 is used and the plane of the micro lenses 22 and/or a neighboring area provide a conjugated relationship with the display screen so that clear and bright color images may be displayed on the screen without showing the mosaic arrangement of R, G and B pixels.

Figure 23:
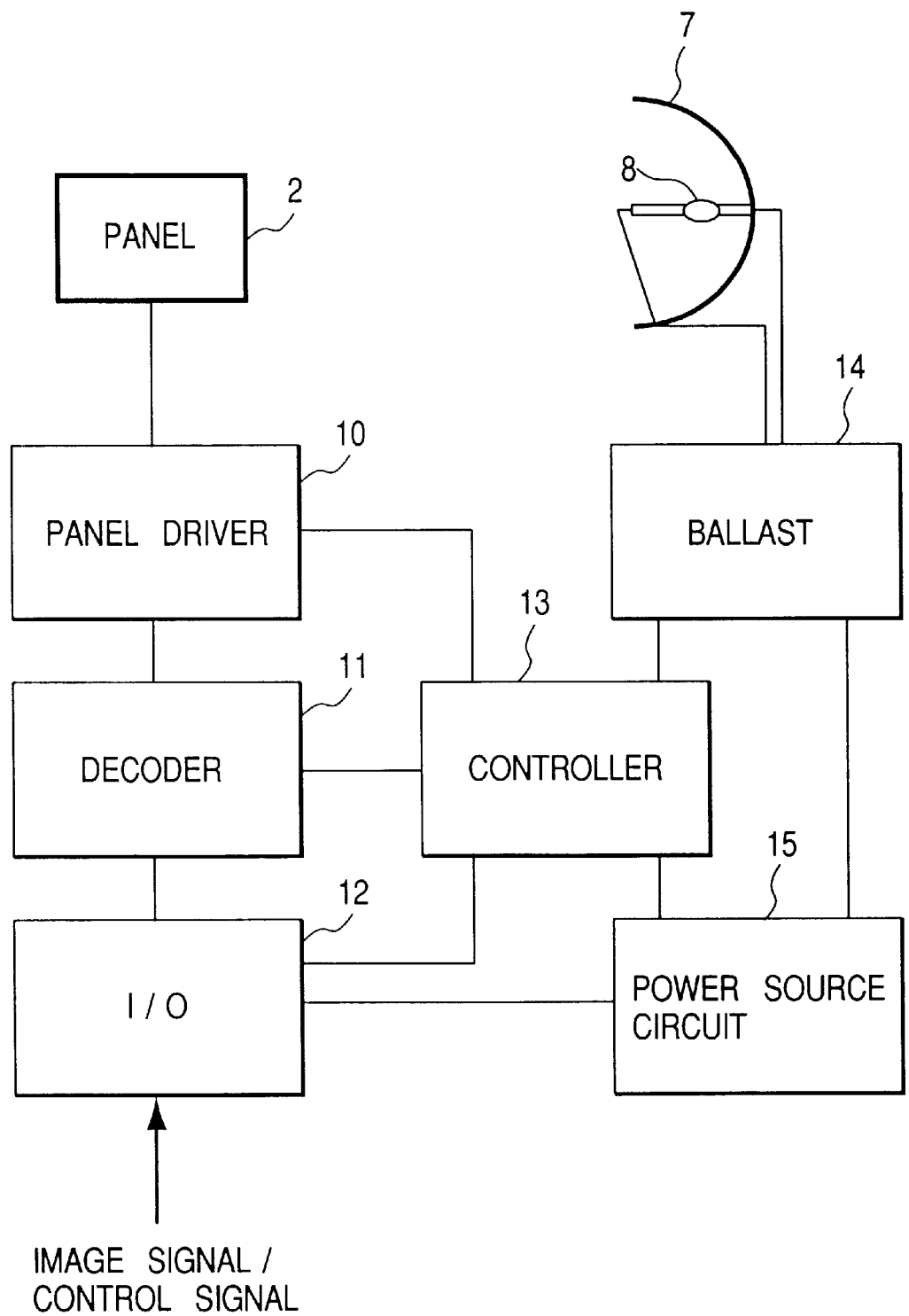
FIG. 23 is a schematic block diagram of the drive circuit system of a projection type display apparatus according to the invention.

FIG. 23 is a block diagram of the drive circuit system of the projection type liquid crystal display apparatus of this example.

Referring to FIG. 23, there are shown a panel driver 10 for producing R, G B video signals along with drive signals for driving the opposite electrode 24 and various timing signals, an interface 12 for decoding video signals and control transmission signals into corresponding standard video signals and so on, a decoder 11 for decoding standard video signals from the interface 12 into primary color signals of R, G and B and synchronizing signals, a ballast 14 for driving an arc lamp 8 to emit light and a power supply circuit 15 for feeding the circuit blocks with power. Reference numeral 13 denotes a controller comprising an operating section (not shown) for controlling the operations of the circuit blocks.

A projection type liquid crystal display apparatus as described above can display clear and bright images without showing the mosaic arrangement of R, G and B pixels.

Figure 25:
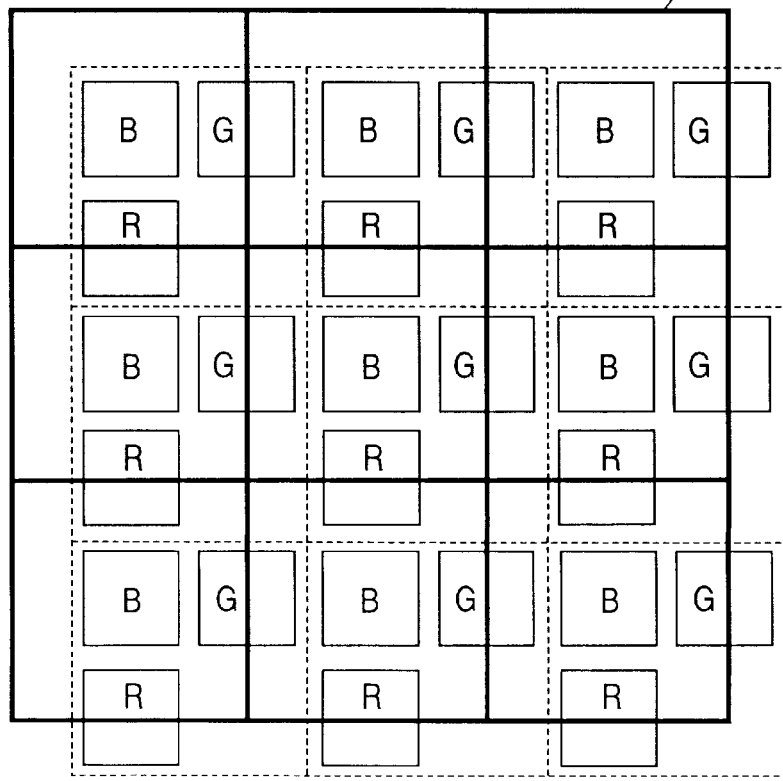
FIG. 25 is an enlarged schematic partial plan view of a liquid crystal panel according to the invention.

FIG. 25 is an enlarged schematic plan view of a modified example of liquid crystal according to the invention. In this example, B pixels are arranged directly below the centers of the respective micro lenses 22 as primary color pixels, whereas G pixels are arranged alternately with the B pixels along the lateral direction as secondary pixels and R pixels are arranged also alternately with the B pixels along the vertical direction as ternary pixels.

With such an arrangement again, rays of B light are made to perpendicularly strike a corresponding pixel unit while those of R/G light are made to strike aslant the pixel unit (in different directions with a same angle of incidence) so that the reflected rays of light leave the pixel unit through a same and common micro lens. Thus, the net result will be exactly same as the preceding example. Alternatively, it may be so arranged that R pixels are arranged directly below the centers of the respective micro lenses 22 as primary pixels and the remaining pixels are arranged alternately and respectively along the lateral and vertical directions.

Now, another example of display apparatus comprising micro lenses will be described.

Figure 26:
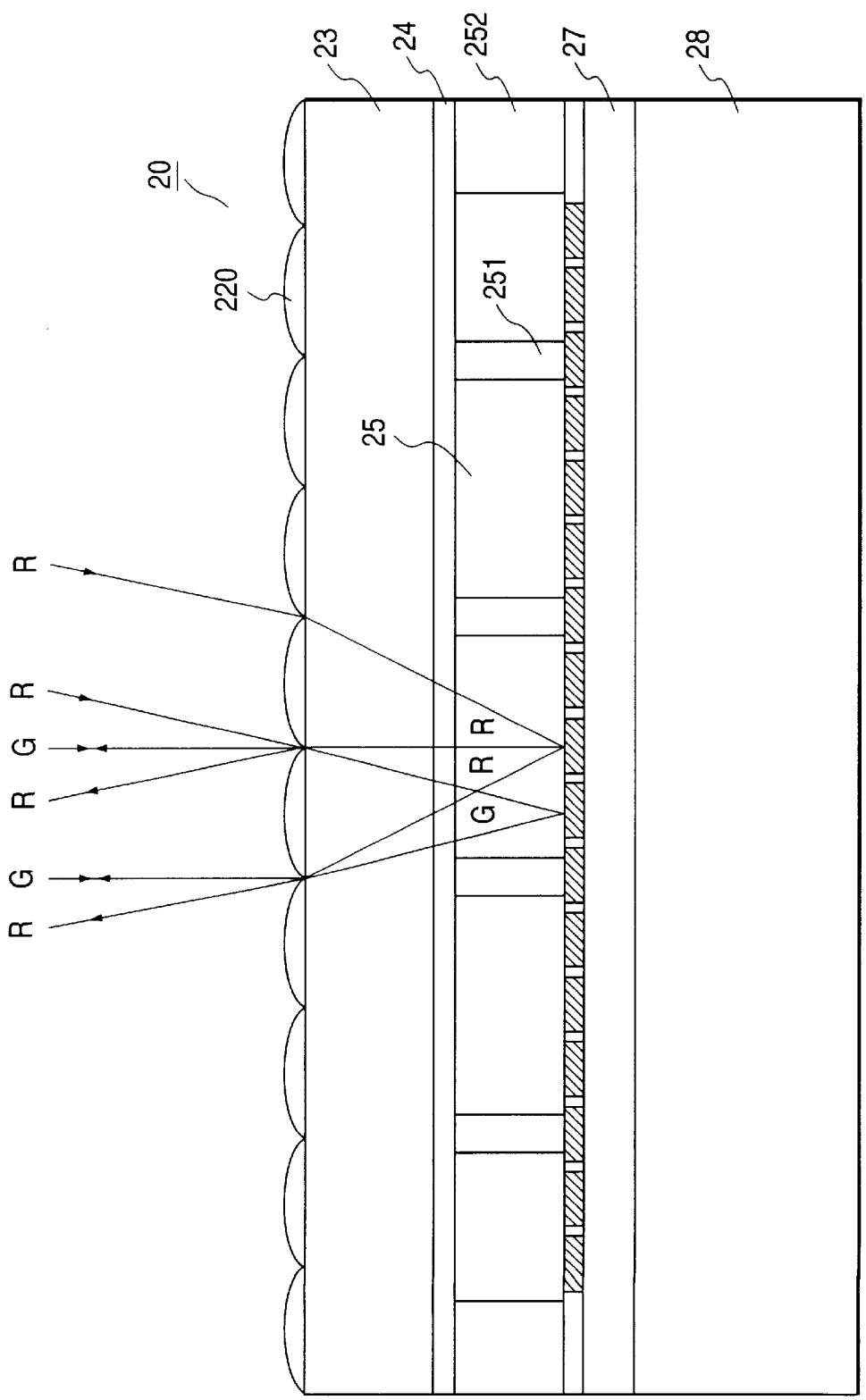
FIG. 26 is a schematic cross sectional view of a liquid crystal panel according to the invention.

FIG. 26 is an enlarged schematic cross sectional view of the liquid crystal panel 20 of this example, showing a principal area thereof. This liquid crystal panel differs from its counterpart of FIG. 19 in that a sheet glass 23 is used for the opposite glass substrate and micro lenses 220 are formed by laying thermoplastic resin on the sheet glass 23 by means of a so-called reflow technique. Additionally, column spacers 251 are arranged in non-pixel areas. The spacers are made of photosensitive resin and produced by photolithography.

Figure 27A:
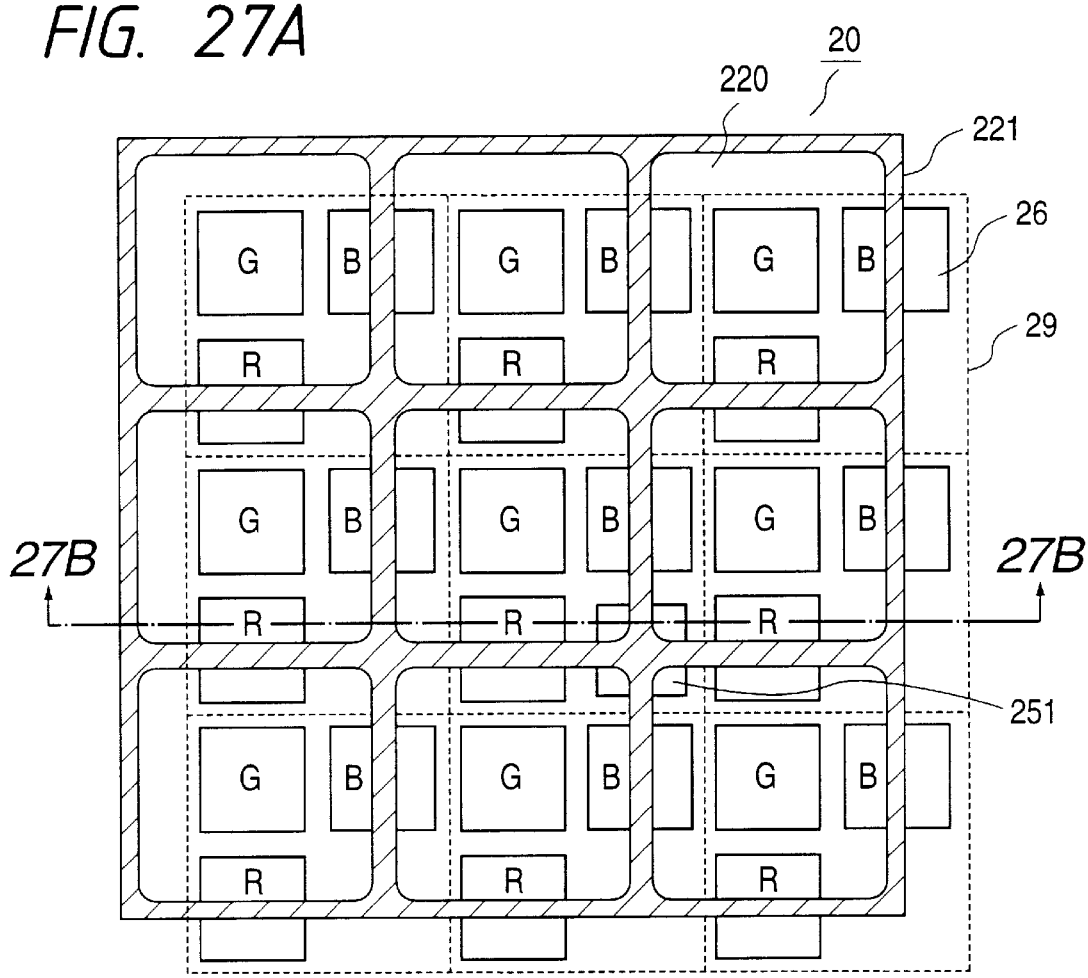
FIGS. 27A and 27B a e an enlarged schematic partial plan view and an enlarged schematic cross sectional side view of a liquid crystal panel according to the invention.
Figure 27B:
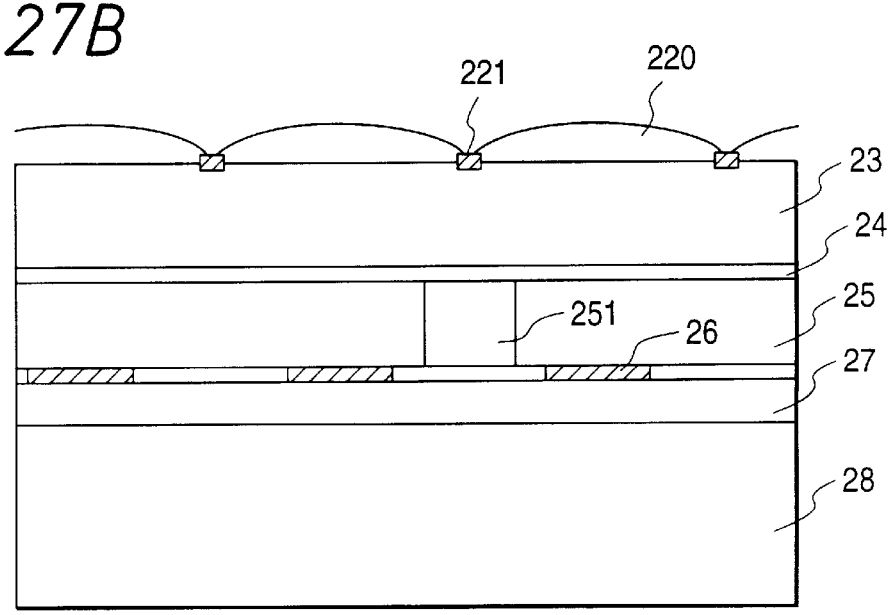

FIG. 27A is a schematic partial plan view of the liquid crystal panel 20. As shown, the column spacers 251 are arranged in non-pixel areas located at the corners of the micro lenses 220 at a predetermined pitch as a function of the pixel arrangement. FIG. 27B shows a cross sectional view taken along a line 27B—27B passing through a column spacer 251. Column spacers 251 are preferably arranged at a pitch corresponding to 10 to 100 pixels to show a matrix of spacers. The arrangement of column spacers has to meet the requirement of flatness of the sheet glass 23 and that of injectability of liquid crystal, which are contradictory to the provision of spacers.

The apparatus of this example additionally comprises a light shielding layer 221 which is a patterned metal film for preventing any leak light from entering the inside through the boundary zones of the micro lenses. This arrangement can effectively prevent degraded color saturation and contrast of the projected image due to leak light. Thus, the apparatus of FIGS. 16A to 16C comprising a liquid crystal panel according to the invention can display clearly defined high quality images.

As described above in detail, the present invention provides the following advantages by arranging a high reflection layer under the opening defined by the pixel electrodes of a liquid crystal display panel to reflect light entering through the openings back them.

(1) The intensity of signal light is raised (and that of the diffracted light component is reduced) to enhance the clearness and the contrast of the displayed image.
(2) Since the areas of the pixel electrode substrate occupied by other than the pixel electrodes can participate in the operation of displaying images, the displayed image is free from the boundary lines of the pixel electrodes and appears very natural.
(3) Since the displayed image is free from the boundary lines of the pixel electrodes, a large number of pixels can be densely arranged on a small panel without giving rise to any problem. When the boundary lines of the pixel electrodes are noticeable, the pixel electrodes have to be so sized as to minimize the effect of the noticeable boundary lines so that a display panel designed to display clear images is inevitably made large as in the case of the display panel of a high definition T V set. The arrangement of a reflection layer according to the invention dissolves this problem.

What is claimed is:

1. A pixel electrode substrate to be used for a liquid crystal apparatus comprising a plurality of pixel electrodes and adapted to display images by causing the pixel electrodes to reflect incident light, characterized in that:
   a reflection layer is arranged below openings defined by said plurality of pixel electrodes to reflect light entering through the openings back to said openings,
   wherein a reflectivity of said reflection layer is between 80% and 120% of that of said pixel electrodes.

2. A pixel electrode substrate according to claim 1, wherein said reflection layer is made of a metal material.

3. A pixel electrode substrate according to claim 2, wherein said metal material contains aluminum.

4. A pixel electrode substrate according to claim 3, wherein said metal material is selected from Al, AlSi, AlSiCu, AlSiGe, AlGeCu, AlC, AlCu and AlSiGeCu.

5. A pixel electrode substrate according to claim 2, wherein said metal material is selected from Cr, Au and Ag.

6. A pixel electrode substrate according to claim 1, wherein said pixel electrodes are made of a metal material.

7. A pixel electrode substrate according to claim 6, wherein said metal material contains aluminum.

8. A pixel electrode substrate according to claim 7, wherein said metal material is selected from Al, AlSi, AlSiCu, AlSiGe, AlGeCu, AlC, AlCu and AlSiGeCu.

9. A pixel electrode substrate according to claim 6, wherein said metal material is selected from Cr, Au and Ag.

10. A pixel electrode substrate according to claim 1, wherein said pixel electrodes are formed on a semiconductor substrate.

11. A pixel electrode substrate according to claim 1, wherein said pixel electrodes are formed on a glass substrate.

12. A pixel electrode substrate according to claim 1, wherein said pixel electrodes are formed by means of chemical-mechanical polishing.

13. A reflection type liquid crystal apparatus comprising a pixel electrode substrate carrying thereon a plurality of pixel electrodes, an opposite substrate disposed vis-a-vis said pixel electrodes and a liquid crystal material filing the gap between the substrates and adapted to display images by causing the pixel electrodes to reflect light entering from said opposite substrate, characterized in that: a reflection layer is arranged below openings defined by said plurality of pixel electrodes to reflect light entering through the openings back to said openings,
   wherein a reflectivity of said reflection layer is between 80% and 120% of that of said pixel electrodes.

14. A reflection type liquid crystal apparatus according to claim 13, wherein said reflection layer is made of a metal material.

15. A reflection type liquid crystal apparatus according to claim 14, wherein said metal material contains aluminum.

16. A reflection type liquid crystal apparatus according to claim 15, wherein said metal material is selected from Al, AlSi, AlSiCu, AlSiGe, AlGeCu, AlC, AlCu and AlSiGeCu.

17. A reflection type liquid crystal apparatus according to claim 14, wherein said metal material is selected from Cr, Au and Ag.

18. A reflection type liquid crystal apparatus according to claim 13, wherein said pixel electrodes are made of a metal material.

19. A reflection type liquid crystal apparatus according to claim 18, wherein said metal material contains aluminum.

20. A reflection type liquid crystal apparatus according to claim 19, wherein said metal material is selected from Al, AlSi, AlSiCu, AlSiGe, AlGeCu, AlC, AlCu and AlSiGeCu.

21. A reflection type liquid crystal apparatus according to claim 18, wherein said metal material is selected from Cr, Au and Ag.

22. A reflection type liquid crystal apparatus according to claim 13, wherein said pixel electrodes are formed on a semiconductor substrate.

23. A reflection type liquid crystal apparatus according to claim 13, wherein said pixel electrodes are formed on a glass substrate.

24. A reflection type liquid crystal apparatus according to claim 13, wherein said pixel electrodes are formed by means of chemical-mechanical polishing.

25. A display apparatus characterized by comprising a reflection type liquid crystal apparatus according to claim 13.

26. A display apparatus according to claim 25, wherein light emitted from a light source is made to irradiate said reflection type liquid crystal apparatus and reflected light is made to irradiate a screen by way of an optical system for displaying images on the screen.

27. A reflection type liquid crystal apparatus according to claim 13, wherein a ratio of a thickness ($d_1$) of said liquid crystal material to a gap ($d_2$) between said pixel electrodes satisfies $d_1/d_2 \geqq 5$.

* * * * *

UNITED STATES PATENT AND TRADEMARK OFFICE
CERTIFICATE OF CORRECTION

PATENT NO. : 6,166,792
DATED : December 26, 2000
INVENTOR(S) : Mamoru Miyawaki et al.

Page 1 of 2

It is certified that error appears in the above-identified patent and that said Letters Patent is hereby corrected as shown below:

Title page,
Item [56] References Cited, under FOREIGN PATENT DOCUMENTS, "9073103" should read -- 9-73103 --; and
Under OTHER PUBLICATIONS, after "Patent Abstracts of Japan, vol. 095, No. 007," "(Casio comput" should read -- (Casio Computer --.

Column 4,
Line 22, "a e" should read -- are --.

Column 5,
Line 7, close up right margin;
Line 8, close up left margin; and
Line 54, "opening" should read -- openings --.

Column 10,
Line 66, "have" should read -- has --.

Column 11,
Line 4, "protect" should read -- protection --;
Line 5, "ion" should be deleted; and
Line 63, "an Ag" should read -- Ag --.

Column 12,
Line 10, "walls" should read -- wall --.

Column 13,
Line 10, "an" should read -- a --;
Line 56, close up right margin; and
Line 57, close up left margin.

Column 14,
Line 24, "signals" should read -- signal --; and
Line 55, "T V" should read -- TV --.

Column 15,
Line 36, "hallide" should read -- halide --;
Line 43, close up right margin; and
Line 44, close up left margin.

UNITED STATES PATENT AND TRADEMARK OFFICE
CERTIFICATE OF CORRECTION

PATENT NO. : 6,166,792
DATED : December 26, 2000
INVENTOR(S) : Mamoru Miyawaki et al.

It is certified that error appears in the above-identified patent and that said Letters Patent is hereby corrected as shown below:

Column 16,
Lines 51 and 56, "is" should read -- are --.

Column 17,
Line 21, "shows" should read -- show --.

Column 18,
Line 15, "tow-dimensional" should read -- two-dimensional --; and
Line 60, "which" should read -- and --.

Column 20,
Line 62, "G B" should read -- G and B --.

Column 21,
Line 67, "back" should read -- behind --.

Signed and Sealed this

Eighteenth Day of December, 2001

Attest:

JAMES E. ROGAN
Attesting Officer   Director of the United States Patent and Trademark Office